(12) United States Patent
Eberlein et al.

(10) Patent No.: US 8,369,774 B2
(45) Date of Patent: Feb. 5, 2013

(54) TERRESTRIAL TRANSMITTING STATION FOR TRANSMITTING A TERRESTRIAL BROADCAST SIGNAL, SATELLITE-AIDED BROADCAST SYSTEM AND RECEIVER FOR A SATELLITE-AIDED BROADCAST SYSTEM

(75) Inventors: Ernst Eberlein, Erlangen (DE); Albert Heuberger, Erlangen (DE); Marco Breiling, Erlangen (DE); Stefan Lipp, Nuremburg (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 1309 days.

(21) Appl. No.: 11/917,588

(22) PCT Filed: Jun. 14, 2006

(86) PCT No.: PCT/EP2006/005746
§ 371 (c)(1),
(2), (4) Date: Feb. 7, 2008

(87) PCT Pub. No.: WO2006/133932
PCT Pub. Date: Dec. 21, 2006

(65) Prior Publication Data
US 2008/0200114 A1    Aug. 21, 2008

(30) Foreign Application Priority Data
Jun. 14, 2005   (DE) .................... 10 2005 027 453

(51) Int. Cl.
*H04B 7/185*   (2006.01)
(52) U.S. Cl. .................................................. 455/12.1
(58) Field of Classification Search .......... 455/10, 455/12.1, 13.1, 16, 23, 98, 101, 103, 105
See application file for complete search history.

(56) References Cited

U.S. PATENT DOCUMENTS 5,590,403 A * 12/1996 Cameron et al. ............. 455/503
(Continued)

FOREIGN PATENT DOCUMENTS
EP     1 528 742 A2   4/2005

OTHER PUBLICATIONS

"Multimedia Broadcast/Multicast Services for Mobile System: State of the Art," EC concertation meetings; Sep. 16 and 17, 2003; FP/IST MAESTRO Integrated Project Overview, pp. 1-12, ftp.cordis.europa.eu/pub/ist/docs/ka9.

(Continued)

*Primary Examiner* — Duc Nguyen
*Assistant Examiner* — Mark Woodall
(74) *Attorney, Agent, or Firm* — Keating & Bennett, LLP

(57) ABSTRACT

A terrestrial transmitting station for sending out a terrestrial broadcast signal includes a first receiver for receiving a signal to obtain a satellite receive signal, a second receiver for receiving a local signal to obtain a local receive signal and a signal combiner for combining the first receive signal with the local receive signal to form a combination signal. The signal combiner is implemented to generate the combination signal so that the combination signal is formed according to a hierarchical modulation, wherein the first receive signal is contained in a base layer of the hierarchical modulation and wherein the local receive signal is contained in an overlay layer of the hierarchical modulation. A terrestrial transmitting station further includes a transmitter for sending out the combination signal. A broadcast system includes a first transmitter and at least one terrestrial transmitting station. The information emitted from the satellite-based broadcast system may be received using an associated receiver. An inventive broadcast system allows adding a local information to a supraregionally emitted transmit signal in a frequency-efficient way.

21 Claims, 17 Drawing Sheets

U.S. PATENT DOCUMENTS

| | | | | |
|---|---|---|---|---|
| 5,596,439 | A | * | 1/1997 | Dankberg et al. ............... 398/35 |
| 5,761,605 | A | * | 6/1998 | Tawil et al. ...................... 725/67 |
| 5,926,758 | A | * | 7/1999 | Grybos et al. ................. 455/429 |
| 6,336,042 | B1 | * | 1/2002 | Dawson et al. ............ 455/562.1 |
| 6,434,384 | B1 | * | 8/2002 | Norin et al. .................. 455/429 |
| 6,463,282 | B2 | * | 10/2002 | Norin et al. .................. 455/429 |
| 6,606,307 | B1 | * | 8/2003 | Chang et al. ................. 370/316 |
| 6,741,834 | B1 | | 5/2004 | Godwin |
| 6,862,269 | B1 | * | 3/2005 | Nasta ........................... 370/320 |
| 6,892,050 | B1 | * | 5/2005 | Tawil et al. ................. 455/12.1 |
| 2002/0006795 | A1 | * | 1/2002 | Norin et al. .................. 455/429 |
| 2004/0203539 | A1 | * | 10/2004 | Benes et al. .................. 455/101 |
| 2005/0059343 | A1 | * | 3/2005 | Lee ............................. 455/12.1 |
| 2005/0111581 | A1 | | 5/2005 | Walker et al. |
| 2005/0113040 | A1 | | 5/2005 | Walker et al. |
| 2005/0117669 | A1 | | 6/2005 | Walker et al. |

OTHER PUBLICATIONS

Shertz et al.; "DVB-T MIT Hierarchischer Modulation," Technisch-Wissenschaftliches Kolloguium; Apr. 19, 2004, pp. 1-19.

"Systems for Digital Satellite Broadcasting to Vehicular, Portable and Fixed Receivers in the Bands Allocated to BSS (Sound) in the Frequency Range 1 400-2 700 MHz," Recommnedation ITU-R BO. 1130-4; 2001; pp. 1-89.

Vandermot et al.; "S-DMB Transmission Testbed for MoDiS," IST Mobile and Wireless Communications Summit 2004; Jun. 2004; www.ist-modis.org/docs/publications.

Chuberre et al.; "Satellite Digital Multimedia Broadcasting for 3G and Beyond 3G Systems," 13th IST Mobile & Wireless Communication Summit 2004; Jun. 2004.

"Digital Video Broadcasting (DVB); DVB-H Implementation Guidelines," European Telecommunications Standards Institute; Jan. 2005; Draft ETSI TR 102 377 VI.I.I; http://www.etsi.org; pp. 1-89.

Shertz et al.; "DVB-T MIT Hierarchischer Modulation," Technisch-Wissenschaftliches Kolloguium; Apr. 19, 2004; pp. 1-19.

"Digital Video Broadcasting (DVB); Framing Structure, Channel Coding and Modulation for Digital Terrestrial Television," European Telecommunications Standards Institute; Nov. 2004; ETSI EN 300 744 V1.5.1; http://www.etsi.org, pp. 1-49.

Faller et al.; "Technical Advances in Digital Audio Radio Broadcasting," Proceedings of the IEEE, vol. 90, No. 8; Aug. 2002; pp. 1303-1333.

DSB Handbook—Terrestrial and Satellite Digital Sound Broadcasting to Vehicular, Portable and Fixed Receivers in the VHF/UHF Bands, International Telecommunication Union, 2002; pp. 12-15; 135-143; 157-355; 743-759.

Layer; "Digital Radio Takes to the Road," National Association of Broadcasters; IEEE Spectrum; Jul. 2001; pp. 40-48.

* cited by examiner

FIGURE 1: principle of hierarchical modulation image 4: principle of hybrid systems image 5: typical frequency plan for hybrid systems with different carrier frequencies for the satellite signal and the terrestrial signal image 6: transmitter architecture of a hybrid system with "transcoding"

image 7: satellite system with GAP filler image 15 : example for the allocation of carrier frequencies

TERRESTRIAL TRANSMITTING STATION FOR TRANSMITTING A TERRESTRIAL BROADCAST SIGNAL, SATELLITE-AIDED BROADCAST SYSTEM AND RECEIVER FOR A SATELLITE-AIDED BROADCAST SYSTEM

TECHNICAL FIELD

The present invention generally relates to a terrestrial transmitting station for transmitting a terrestrial broadcast signal, to a satellite-aided broadcast system and a receiver for a satellite-aided broadcast system, and, in particular, to a terrestrial transmitting station for receiving a satellite signal and transmitting a broadcast signal with a hierarchical modulation as well as a corresponding satellite-aided broadcast system and an associated receiver.

BACKGROUND

Satellite-aided systems offer the possibility of a large-area supply. With this, the service may be made available everywhere. This is especially advantageous for broadcast applications or large-area data distribution services. Satellite systems are particularly suitable for reception with a direct line-off-sight to the satellite and for mobile reception in the car. For receivers in a house and partly also for hand-held applications, the field strength of the satellite signals is often insufficient. In order to guarantee the availability of the signal also in cities or within buildings, terrestrial transmitters are used which then make the signal available with a significantly higher field strength in densely built-up areas, for example.

On the other hand, terrestrial systems have the advantage that in each region, different information is emitted and data are emitted, for example, which are relevant for only one region.

PRIOR ART

Systems for Digital Broadcasting

An overview over the different systems for digital broadcasting may be found, among others, in the following publications:
ITU Recommendation BO 1130-4
DSB Handbook—Terrestrial and satellite digital sound broadcasting to vehicular, portable and fixed receivers in the VHF/UHF bands, ITU 2002.

Further, the following systems in particular are relevant for the present invention
DVB-T (ETSI Standard EN 300 744)
S-DARS (XM Satellite Radio and Sirius Satellite Radio).
Solution approaches, such as pursued in research projects such as MAESTRO (CDMA-based solution), are also relevant for the present invention.
Hierarchical Modulation Hierarchical modulation is supported by standards such as DVB-T. In FIG. 1 (illustration 1), the principle is illustrated by way of example. It is the constellation diagrams of digitally-modulated signals that are illustrated.

In the basic configuration (base layer), for example, four possible states are used (a QPSK=4-QAM constellation is illustrated in the upper-half of the picture). This corresponds to 2 bits per modulation symbol.

In a further layer (overlay layer), in the following also referred to as "overlay layer", these points are divided into sub-points. In this context, extensions into the phase ("A", left-hand side of FIG. 1), amplitude ("B", middle of FIG. 1) or both ("C", right-hand side of FIG. 1) are conceivable.

The illustrated constellation diagrams represent the signal without noise and other distortions. As a rule, however, the receive signal is strongly overlaid with noise. A receiver using only the base layer evaluates only the information in which quadrant the signal is located. A receiver that wants to decode the overlay signal, too, in the following also referred to as "expansion signal", also tries to distinguish the points within a quadrant. Corresponding to the strength of the noise signal, decision errors here occur. Obviously, decision errors occur earlier for the overlay signal. Accordingly, the required signal-to-noise ratio is higher for the overlay signal. For this reason, hierarchical modulation has up to date been deployed only in the context of supply planning. For example, signals with a smaller coverage (smaller supply area) and signals with a larger coverage may be emitted via the same transmitter. This principle is realized in DVB-T, for example. With this, it may also be achieved, in a similar form, that particularly important information has a smaller error rate.

The ETSI Standard DVB-T

The principle of hierarchical encoding is also described in the ETSI standard EN 300744, for example. FIG. 2 (illustration 2) offers an overview over the transmitter. The transmitter contains two parts:
A data source with associated source encoders (for the DVD-T Standard, it is the audio and video encoder, for example, such as described in the MPEG2 Standard) and associated multiplexers, so that several programs may be emitted via one transmitter, for example.
The actual transmitter ("Terrestrial Channel Adapter"), which adds the error protection (outer coder and inner coder) and performs the modulation.

The terrestrial channel adapter of the DVB-T Standard supports up to two inputs. A high priority (HP) data stream is applied over input #1. These data are transmitted with higher reliability. Over a second input, low priority (LP) data are applied. These data are transmitted with lesser reliability. This is expressed by a smaller coverage, i.e. the supply area of the HP data is larger.

FIGS. 3a and 3b show examples of signal constellations as established in the DVB-T standard. A non-uniform 16-QAM (FIG. 3a) and a non-uniform 64-QAM constellation (FIG. 3b) are shown.

Satellite Systems with Terrestrial Support—Hybrid Systems

Hybrid systems have been discussed for at least 15 years. The following basic concepts are to be distinguished:
A satellite mainly serves to feed the terrestrial transmitters. A direct reception of the satellite signals is only possible if an antenna with a high antenna gain (e.g. a satellite dish) is installed. In contrast, the terrestrial signal may also be received with very small antennas (such as are common in hand-held devices).
The satellite system is designed such that the satellite signal may be directly received also with small antennas. In this case, only terrestrial GAP fillers are still needed, that is, only in areas in which direct supply by the satellite signal is insufficient, a terrestrial transmitter is installed. Since there would be too many gaps in the direct supply in the cities, as a rule, entire cities are supplied with terrestrial transmitter networks, and the satellite mainly takes on the supply for the flat country so that during reception in a car, for example, a continuous availability is guaranteed when the car leaves the town, for example.

The basic principle of hybrid systems is illustrated in FIG. 4 (illustration 4). In this context, three reception areas (illustrated as rings) are to be distinguished.

In inner cities, in which terrestrial transmitters are installed, the field strength of the terrestrial signal is high in comparison to the satellite signal. Here, correspondingly, terrestrial reception is predominant.

In country areas, there is either no terrestrial signal present or the signal is very low in comparison to the satellite signal. Here, correspondingly, the satellite signal is predominant.

In the transition zone, both of the signals may be utilized. If the signals overlay each other constructively, the quality of supply will thus be increased.

Optimization Goals in System Design

For dimensioning a system, the following frame conditions are to be taken into account:

Bandwidth efficiency:
Within a given bandwidth, a data rate as high as possible is to be transmitted. The bandwidth efficiency, as a rule, is indicated as number of bits per second per Hz bandwidth (bit/sec/Hz).

Power Efficiency:
Power efficiency describes the required transmitting energy per information unit. Power efficiency, as a rule, is indicated as $E_b/N_o$, (=transmitting energy per payload data bit with respect to the noise power density). Power efficiency is particularly of importance for satellite signals. Apart from the required transmitting power emitted, also the efficiency of action of the transmitter is of crucial importance.

Influence of Multipath Propagation

Realizability of the receiver, costs of the receiver

Possible Configurations for a Hybrid System with Direct Reception of the Satellite Signal S-DARS Systems (XM Satellite Radio, Sirius Satellite Radio)

The system architecture is characterized by the following features:

Different carrier frequencies are used for the satellite signal and the terrestrial signal (see FIG. 5, illustration 5).

The terrestrial transmitters transcode the satellite signal (transcoding). A typical architecture is illustrated in FIG. 6 (illustration 6).

Since the terrestrial signal is largely independent of the satellite signal, the following configurations are possible:

The satellite signal and the terrestrial signal have the same content, that is, all satellite signals are transcoded to a terrestrial signal.

If the capacity of the terrestrial signal is greater, programs may be added, for example.

Only parts of the satellite signal are emitted. For example, programs which are of almost no importance for a region (e.g. programs in other languages) may be omitted.

OFDM-Based Solutions with GAP Fillers (e.g. EU147 DAB System)

The same carrier frequencies are used for the satellite signal and the terrestrial signal. The terrestrial transmitters (repeaters or GAP fillers) emit the terrestrial signal at the same carrier frequency. A constructive overlay is only guaranteed if the satellite signal and the terrestrial signal are identical. Typical system configurations are illustrated in FIGS. 7*a* and 7*b*. In simple GAP fillers, the satellite signal is received via a satellite antenna and then amplified and emitted. In order to achieve a better de-coupling from the receiving antenna and the transmitting antenna (without a good de-coupling, the system might swing via back-couplings), antennas with good directivity (e.g. satellite dishes) and filters are deployed.

In order to avoid these problems, an expanded architecture may also be deployed, as shown in FIG. 7*b*. Here, the signal is supplied to the terrestrial transmitter on a separated way. For example, a second satellite transponder may be used. For this feeding, more low-performance (=more cost-effective) transponders are sufficient.

In both cases, the satellite signal and the terrestrial signal should be identical in order to allow a constructive overlay. Feeding regional contents would, in this context, result in neither the terrestrial signal nor the satellite signal being receivable in the transition zone. This destructive overlay may only be avoided if the satellite signal does not utilize the available capacity (e.g. no signal is transmitted in single time slots).

CDM

As a rule, an OFDM modulation is used for systems according to FIGS. 7*a* and 7*b*. In principle, similar configurations are also conceivable with transmission systems using CDM (Code Division Multiplex). Here, the satellite signal and the terrestrial signal use the same carrier frequency, too. In CDM, the single partial signals (e.g. programs) are orthogonally overlaid with spread sequences. Thus, it is conceivable that single terrestrial signals be added if not all spread sequences are used for the satellite signal. Yet at the same time, this means that terrestrial signals may only be complemented if the satellite signal uses the available bandwidth in a relatively poor manner.

Comparative Evaluation of the Described Configurations

The S-DARS approach represents a very good compromise between the power efficiency of the satellite signal, the bandwidth efficiency and the receiver complexity. As a rule, the receiver must contain at least two demodulators (one for the terrestrial signal and one for the satellite signal). However, if the utilized carrier frequencies for the satellite signal and the terrestrial signal are selected carefully, this is limited to a small additional overhead in the digital part of the receiver and may be realized cost-effectively with modern VLSI technology. If, however, more flexibility is necessary in the selection of the carrier frequencies, two RF tuners are needed, which may make the receiver considerably more expensive.

The OFDM solution according to the EU147 proposal has the disadvantage that the overall power efficiency is small local information may only be keyed in if the satellite signal does not utilize the corresponding parts of the multiplex, that is, the bandwidth efficiency is limited.

For the CDMA approach, the following situation arises:

A high power efficiency for the satellite signal may only be obtained if only one spread code is used. In this case, however, the bandwidth efficiency is very poor.

If the satellite signal already uses many spread sequences, a situation similar to OFDM results (poor power efficiency and local information only being able to be keyed in if the corresponding parts for the satellite signals remain unutilized).

US 2005/0113040 A1 describes a method, a receiver and a transmitter for use in a SDAR system. The method includes generating a first modulated signal, based on first input data. An additional modulation is overlaid over the first modulated signal on the basis of additional input data. The additional modulation is distributed via a plurality of symbols in the first modulated signal in a pre-determined pattern to generate a modified signal, which is then emitted. The modified signal is then decoded by a first demodulation of the first modulated signal. Then, an additional demodulation is performed to obtain additional input data. The step of overlying uses a plurality of offset-sequency values to add the additional modulation to the first modulated signal. The offset sequence may be a pseudo-random distribution of offset-sequency values and may further include at least one value with an offset of zero. The additional modulated signal may also be formed as a modulation with a distributed spectrum and the offset sequency may be a pseudo-noise distribution.

The ETSI standard ETSI EN 300 744 with entitled "Digital Video Broadcasting (DVB); Framing structure, channel coding and modulation for digital terrestrial television" describes, in the version 1.4.1, a digital video broadcast system. The system permits a two-stage hierarchical channel encoding and modulation including a uniform constellation and a constellation with different resolutions. The hierarchical order is limited to channel hierarchical encoding and modulation without the use of a source hierarchical encoding. Thus, a program service may be transmitted as a robust version with a small bit rate and a less robust version with a high bit rate at the same time. Alternatively, completely different programs from different data streams may be transmitted with different robustness. The document quoted further describes in detail channel encoding and modulation. For example, a 16-QAM hierarchical modulation and a 64-QAM hierarchical modulation may be deployed.

The article "Technical Advances in Digital Audio Radio Broadcasting" by T. Faller et al., published in Proceedings of the IEEE, Vol. 90, No. 8, August 2002, pages 1303-1333 provides an overview over different digital broadcast systems including the source encoding, channel encoding and modulation used. The quoted article further provides background information concerning underlying system structures as well as further details with regard to a signal conditioning on part of the transmitter and on part of the receiver.

The lecture "DVB-T mit hierarchischer Modulation" ("DVB-T with hierarchical modulation") by A. Schertz and C. Weck, published at the Technical Scientific Colloquium of the Institute for Broadcast Technology on Apr. 19, 2004, describes the principle of hierarchical modulation in the DVB-T broadcast system. The lecture quoted deals with the frequency spectrum of a DVB-T transmission, the modulation used as well as different provisions when deploying hierarchical modulation, for example. The lecture further describes the use of a different error protection for a high-priority data stream as well as a low-priority data stream. The lecture quoted further gives concrete examples for different supply situations, comparing a uniform modulation to a hierarchical modulation.

EP 1 528 742 A2 describes a method and a device for providing signal acquisition and frame synchronization in a hierarchical modulation scheme. In this context, a concept supporting signal acquisition and frame synchronization in a digital broadcast system using low-density parity check codes is described. A hierarchical modulation is used to guarantee backward compatibility, whereby the signal of the lower layer is encoded using encoding with a low-density parity check (LDPC encoding; LDPC=Low-Density Parity Check). A signal normalized according to the hierarchical modulation scheme is received, the hierarchical modulation scheme including an upper layer and a lower layer. The signal comprises a data pattern and an encoded frame. The dependence of the received signal upon the modulation of the upper layer is removed. The signal with the removed modulation is correlated with several predetermined data patterns to determine the data pattern of the signal. A code rate of the encoded frame is identified on the basis of the determined data pattern.

U.S. Pat. No. 6,741,834 B1 describes a device and a method for improving an integrated presentation of existing radio services and advanced multimedia services. The concept described allows the provision of an integrated presentation of existing media program services and secondary media program services. The method includes accepting a selection of a secondary media program transmitted on a secondary media program channel. The method further includes accessing a mapping to determine a primary media channel associated with the selected secondary media program channel. The method further includes instructing a first tuner module to receive conditional access information associated with the primary media channel from the primary service provider. The conditional access information is then evaluated to determine whether a second tuner is authorized to receive the secondary media program channel. The method further includes instructing the second tuner module to receive the secondary media program if the second tuner is authorized to receive the secondary media program channel.

SUMMARY

According to an embodiment, a broadcast system may have a first terrestrial transmitting station for sending out a first terrestrial transmit signal, having an associated first receiver for receiving a first transmit signal to obtain a first receive signal, an associated second receiver for receiving a first local signal to obtain a local receive signal, a signal combiner for combining the first receive signal with the local receive signal to form a combination signal, wherein the signal combiner is implemented to generate the combination signal so that the combination signal is formed according to a hierarchical modulation, wherein the first receive signal is included in a base layer of the hierarchical modulation, and wherein the local receive signal is included in an overlay layer of the hierarchical modulation, and a transmitter for sending out the first combination signal as the first terrestrial transmit signal; and a second terrestrial transmitting station for sending out a second terrestrial broadcast signal, having an associated first receiver for receiving the first transmit signal to obtain an associated receive signal, an associated second receiver for receiving a second local signal, to obtain an associated local receive signal, an associated signal combiner for combining the receive signal with the associated local receive signal to form an associated combination signal, wherein the signal combiner is implemented to generate the associated combination signal so that the associated combination signal is formed according to a hierarchical modulation, wherein the associated receive signal is included in a base layer of the hierarchical modulation, and wherein the associated local receive signal is included in an overlay layer of the hierarchical modulation, and an associated transmitter for sending out the associated combination signal as the second terrestrial transmit signal, wherein the first terrestrial transmitting station and the second terrestrial transmitting station are implemented to receive different local signals, and wherein the first local signal is different from the second local signal; wherein the first terrestrial transmitting station and the second terrestrial transmitting station are implemented so that the combination signal emitted from the first terrestrial transmitting station and the combination signal emitted from the second terrestrial transmitting station have an equal carrier frequency and an equal modulation type; wherein the first terrestrial transmitting station and the second terrestrial transmitting station are further implemented or arranged so that an overlapping area exists in which the combination signal emitted from the first terrestrial transmitting station and the combination signal emitted from the second terrestrial transmitting station constructively overlap regarding the base layer of the hierarchical modulation; wherein the carrier frequency of the combination signals emitted from the terrestrial transmitting station is equal to a carrier frequency of a second transmit signal which is a satellite signal and which is receivable in the overlapping area; wherein the first transmit signal has a payload data content including a payload data content of the second transmit signal; wherein an information included in the base layer of the signal emitted from the first terrestrial transmitting station is equal to an information included in the base layer of the second transmit signal; and wherein the base layer of the hierarchical modulation of the second transmit signal is equal to the base layer of the hierarchical modulation of the combination signal emitted from the second terrestrial transmitting station.

According to another embodiment, a broadcast system may have a first transmitter which is implemented to emit a first transmit signal; and a first terrestrial transmitting station for sending out a first terrestrial transmit signal, having a first receiver for receiving the first transmit signal to obtain a first receive signal, a second receiver for receiving a first local signal to obtain a local receive signal, a signal combiner for combining the first receive signal with the local receive signal to form a combination signal, wherein the signal combiner is implemented to generate the combination signal so that the combination signal is formed according to a hierarchical modulation, wherein the first receive signal is included in a base layer of the hierarchical modulation, and wherein the local receive signal is included in a overlay layer of the hierarchical modulation, and a transmitter for sending out the first combination signal as the first terrestrial transmit signal.

The present invention provides a terrestrial transmitting station for transmitting a terrestrial broadcast signal with a first receiver for receiving a first signal to obtain a first receive signal and a second receiver for receiving a local signal to obtain a local receive signal. The terrestrial transmitting station further includes a signal combiner for combining the first receive signal with the local receive signal to form a combination signal, with the signal combiner being formed to generate the combination signal such that the combination signal is formed according to a hierarchical modulation, wherein the first receive signal is contained in a basis layer of the hierarchical modulation and wherein the local receive signal is contained in an overlay layer of the hierarchical modulation. The inventive terrestrial transmitting station further includes a transmitter for transmitting the combination signal.

It is the basic idea of the present invention that it is advantageous to combine, in a terrestrial transmitting station in a signal combiner, a satellite receive signal, or a first receive signal, generated by a first receiver due to a signal, or satellite signal, emitted in a large area and a local receive signal generated by a second receiver due to a local signal such that a combination signal develops formed according to a hierarchical modulation and in which the satellite receive signal is contained in a basis layer of the hierarchical modulation and the local receive signal is contained in an overlay layer of the hierarchical modulation.

It should be understood that the term satellite receive signal is used in the following by way of example to designate a signal emitted in a large area. The inventive advantages may be achieved with any kind of signals emitted in a large area. The signal emitted in a large area is in the following also referred to as a first signal and may be emitted through a single frequency network, for example. In this context, a terrestrial transmitting station may emit a local information.

The present invention is advantageous in that it provides a terrestrial broadcast signal which, at least in part, is based on a satellite signal. Further, according to the invention, the advantages of satellite-aided systems and terrestrial systems are joined and emitting a terrestrial broadcast signal complemented by local programs compared to the satellite signal is allowed, without any strong interferences developing between the satellite signal and the terrestrially emitted signal, wherein, however, a sufficient bandwidth efficiency and power efficiency are achieved.

According to the core idea of the present invention, it has been found that interferences between the satellite signal and the combination signal as well as between combination signals of several terrestrial transmitting stations may be minimized by transmitting the satellite signal in the basis layer of the hierarchical modulation, while the local receive signal received by the second receiver in a de-centralized manner is contained in the overlay layer of the hierarchical modulation. The basis layer of the hierarchical modulation determines an approximate location of a modulation symbol in a constellation diagram while, according to the overlay layer, the approximate location of a modulation symbol in the constellation diagram is only insignificantly altered. In other words, the basis layer of the hierarchical modulation contains a greater energy than the overlay layer and, thus, may cause a larger signal-to-noise ratio at a given location than the overlay layer. As for the rest, the deployment of a plurality of inventive terrestrial transmitting stations of the same kind in a direct spatial neighborhood is possible without a mutual significant interference. Two spatially adjacent terrestrial transmitting stations typically receive the same satellite signal, yet different local signals. Both of the terrestrial transmitting stations then emit two combination signals whose modulation content in the basis layer is the same. The modulation contents of the overlay layer of the combination signals emitted from both of the terrestrial transmitting stations considered might, however, differ, depending upon the respective local signals. However, it should be established that due to the fact that both of the terrestrial transmitting stations emit combination signals with the same content in the basis layer, no interfering overlay, but, on the contrary, a constructive overlay of the combination signals transmitted from both of the transmitting stations develops. Thus, the modulation content of the basis layer of the hierarchical modulation, which is the same in both of the transmitting stations considered, may be received at any location without an interfering overlay which might deteriorate the signal properties.

Thus, the information of the local signal is only overlaid to the information of the satellite signal as an additional signal, which does not influence the reception of the information contained in the basis layer of the hierarchical modulation. As for the rest, even the presence of several combination signals containing the same information in the basis layer of the hierarchical modulation does not impair the reception of the information contained in the basis layer, even if the information contained in the additional layers of the hierarchical modulation of both the combination signals is different.

Thus, in an advantageous manner, an inventive terrestrial transmitting station allows emitting the terrestrial broadcast signal, which may include both information contained in a satellite signal which may be received globally, or suprarregionally, and an information contained in a local signal. The global information contained in the satellite signal is not subjected to interferences between adjacent terrestrial transmitting stations. Neither does a disturbing interference with a satellite signal whose basis layer information is equal to the basis layer information of the combination signal occur in an inventive transmitting station.

Thus, it is possible to operate several terrestrial transmitting stations without any further matching, and using same carrier frequencies for the combination signals emitted without the modulation content in the basis layer being disturbed. Therefore, the unplanned (ad hoc) operation of several terrestrial transmitting stations is possible without thereby disturbing the information contained in the satellite signal. Thus, an inventive terrestrial transmitting station may also be provided as a cost-effective and a license-free end consumer product.

In a preferred embodiment, the first receiver is a satellite receiver formed to receive the satellite signal from a satellite. Further, it is preferred that the second receiver be different from the first receiver. Preferably, the first receiver may be a reproduction means for an analog medium, a reproduction means for a digital medium, a programmable computer configured to generate a digitally encoded message for distribution via the terrestrial broadcast signal or a receiver for a terrestrial radio signal. The second receiver may further also be a receiver for an optical signal (e.g. from laser or an optical waveguide) or a receiver for a wire-connected signal. In this context it is preferred that the second receiver provide local information different from the satellite receive signal. In this case, the advantages of an inventive transmitting station are very effective.

Further, it is preferred that the second receiver include a source encoder designed for source-encoding the local signal to obtain the local receive signal. By source encoding, it may be achieved, for example, that the data rate of the local signal becomes sufficiently small, so that a transmission in the overlay layer of the hierarchical modulation becomes possible. Due to its principle, the overlay layer of the hierarchical modulation may only transmit a data rate significantly smaller than the basis layer of the hierarchical modulation. This is due to the fact that the energy per data symbol contained in the overlay layer is substantially smaller than the energy per data symbol contained in the basis layer of the hierarchical modulation.

Further, it is preferred that the second receiver comprises a channel encoding means for channel encoding the local signal designed to encode or recode the local signal to a predetermined code rate it so that the source-encoded local receive signal develops. The use of an effective channel encoding for the local receive signal is very important, since the local receive signal is transmitted in the overlay layer of the hierarchical modulation. As already mentioned, the signal energy per data symbol for the information transmitted in the overlay layer of the hierarchical modulation is significantly smaller than the signal energy per data symbol for the information transmitted in the basis layer of the hierarchical modulation. In order to counter-balance the different energies of the information transmitted in the overlay layer of the hierarchical modulation and the basis layer of the hierarchical modulation, it is advantageous to add, in the information transmitted in the overlay layer of the hierarchical modulation (that is, the local receive signal), an effective redundancy which is helpful for the error correction in the receiver. With this, it is accomplished that the local receive signal transmitted in the overlay layer of the hierarchical modulation may be transmitted with approximately the same reliability or bit error rate (after channel decoding) as the satellite signal transmitted in the basis layer. Thus, in contrast to conventional systems, it is achieved that the satellite receive signal and the local receive signal may be transmitted from the terrestrial transmitting station with a hierarchical modulation, wherein the same or approximately the same coverage for the satellite signal contained in the combination signal and the local signal contained in the combination signal may still be achieved.

It is understood that the satellite signal, too, preferably comprises channel encoding. Typical code rates lie in the range of 0.5. In contrast, the code rate of the local receive signal is typically much smaller (typically 0.2, for example).

In the preferred embodiment, the signal combiner is designed to add the local receive signal to the satellite receive signal by the signal combiner overlying an expansion signal independent of a data symbol of the local receive signal over the satellite receive signal. Here, it is possible that the expansion signal is further also dependent upon a data symbol of the satellite receive signal. Thus, the combination signal may be generated by overlying two signals, without the satellite receive signal having first to be converted back into a digital signal to generate the combination signal. Additionally, in this case, the satellite receive signal forming the basis layer of the hierarchical modulation and the expansion signal describing the transition from the basis layer to the overlay layer of the hierarchical modulation are present in a separated form and, thus, may be advantageously processed separately from each other.

Further, it is preferred that the signal combiner be designed such that the expansion signal is typically weaker than the satellite receive signal by at least 6 decibel. Preferably, the expansion signal is weaker than the satellite receive signal by even at least 10 decibel. Thereby, it is achieved that the expansion signal is sufficiently small to minimize interferences with signals of adjacent transmitting stations using the same satellite receive signal but another local receive signal.

In a further preferred embodiment, the first receiver includes a demodulator designed to demodulate the satellite receive signal and obtain a representation of the satellite receive signal in the form of encoded data symbols of the satellite receive signal. Preferably, the signal combiner includes a bitstream combiner designed to combine the encoded data symbols of the satellite receive signal with encoded data symbols of the local receive signal to obtain combined data symbols. In this embodiment, the signal combiner further includes a mapper designed to map the combined data symbols onto modulation symbols, using the information of a constellation diagram describing the overlay layer of the hierarchical modulation. Based on the modulation symbols, the modulated combination signal may then be generated by a suitable modulator (which may be part of the transmitter, for example). The bitstream combiner and the mapper are preferably adapted such that the basis layer of the digital modulation is used for a transmission of an information contained in the satellite receive signal (e.g. in the form of encoded data symbols) and such that the overlay layer of the digital modulation is used for a transmission of information contained in the local receive signal (e.g. in the form of encoded data symbols). In other words, bit data of the satellite receive signal and the local receive signal are combined to combined data symbols, which then are mapped onto modulation symbols by the mapper. Here, the satellite receive signal describes the basis layer, that is, the "approximate" location of a modulation symbol in a constellation diagram. In contrast to this, the local receive signal establishes the "accurate" location of the modulation symbol in the constellation diagram. For example, the satellite receive signal establishes in which quadrant of the constellation diagram a modulation symbol is located, while the local receive signal serves to select one from several modulation symbols present in the quadrant established by the satellite receive signal.

Further, it is preferred that a carrier frequency of the combination signal emitted from the terrestrial transmitting station be selected to be equal to a carrier frequency of the satellite signal. Such design brings about particularly great advantages over known conventional solutions. The inventive terrestrial transmitting station emits a combination signal, which differs from the satellite signal substantially only in that the combination signal utilizes an overlay layer of the hierarchical modulation, while the satellite signal only utilizes the basis layer of the hierarchical modulation. Here, it is particularly advantageous if the modulation method used in emitting the combination signal is equal to the modulation method of the satellite signal. In this case, the combination signal emitted from the terrestrial transmitting station and the satellite signal differ only by the information contained in the overlay layer and supplied from the local signal. The combination signal emitted from the terrestrial transmitting station thus includes the information of the satellite signal plus the information of the local signal. The satellite signal and the combination signal do not substantially interfere with each other, even though both of them are emitted at the same carrier frequency.

The cause for this is that only one additional information contained in the overlay layer is added to the combination signal from the transmitting station (related to the satellite signal), while the information contained in the basis layer of the combination signal remains unchanged compared to the satellite signal. Thus, a positive (constructive) overlay always takes place between the satellite signal and the emitted combination signal. Further, a receiver must be designed only for reception at one carrier frequency. Depending upon the circumstances, the receiver may receive either only the satellite signal (if it is distant enough from the terrestrial transmitting station), an overlay of the satellite signal and the terrestrial combination signal (if it is near enough to the terrestrial transmitting station and the satellite signal is not shaded) or only the combination signal (if it is near to the terrestrial transmitting station and the satellite signal is shaded by a building, for example). In all of the three cases, a receiver may receive the information contained in the basis layer of the hierarchical modulation (based on the satellite signal, or supplied by the satellite signal alone) without interference between the satellite signal and the combination signal. If the receiver is near enough to the terrestrial transmitting station, it may, in addition to the information contained in the basis layer of the hierarchical modulation, also receive the information contained in the overlay layer of the hierarchical modulation and based on the local signal. The receiver also may receive the information of the basis layer and the overlay layer at the same time without having to comprise a second high frequency part or a signal conditioning for a second carrier frequency for this purpose. Thus, receivers with a very simple high frequency input part may be used, or provided, which may always receive all available information (that is, always the information contained in the basis layer and additionally maybe the information contained in the overlay layer).

Further, it is preferred that the terrestrial transmitting station include a delay means designed to introduce a delay into the signal path (in the transmitting station) such that the satellite signal and the combination signal emitted from the terrestrial transmitting station are phased at a predetermined location. The delay time of the delay means may be fixedly predetermined, for example, or may be derived from time signals contained in the satellite signal. Further, the terrestrial transmitting station may include a remote monitoring means, which may establish a phase shift between the satellite signal and the signal supplied from the terrestrial transmitting means and which may act upon the delay means of the terrestrial transmitting station such that the phase shift becomes zero. With this, the simultaneous reception of the satellite signal and the combination signal emitted from the transmitting station may be optimized even in a difficult area.

Further, it is preferred that the first receiver be designed to derive, from the satellite signal, a modified satellite receive signal in which a data content of a data channel present in the satellite signal is replaced with another data content. It is preferred that the other data content be contained in the local signal, or be taken from the local signal. Thereby, a data content of the satellite signal may be replaced with a data content of the local signal in the combination signal emitted from the terrestrial transmitting station. This is advantageous if no sufficient capacity for emitting the data content contained in the local signal is otherwise present. It should be understood that such a solution is preferably deployed if the satellite signal and the combination signal comprise different carrier frequencies.

Further, it is possible that the first receiver is designed to derive, from the satellite signal, a modified satellite receive signal only in part containing a data content of the satellite signal. In other words, it is possible to emit only a part of the data content of the satellite signal. This may be required for legal reasons concerning media, for example. Such a measure may also serve for saving transmitting power.

Further, the present invention provides a satellite-aided broadcast system with a satellite designed to transmit a satellite signal and with a first terrestrial transmitting station. Such a satellite-aided broadcast system allows a distribution of the broadcast signal both via the satellite and via one or more terrestrial transmitting stations. Further, an inventive satellite-aided broadcast system allows local information supplied to the terrestrial transmitting station via a local signal to be combined with the satellite signal such that the terrestrial transmitting station emits a combination signal comprising both the information of the satellite signal and the information of the local signal and further not entering a destructive, or interfering, interaction with the satellite signal. Rather, a constructive overlay of the satellite signal and the terrestrially emitted combination signal may be accomplished. All further advantages of the inventive satellite-aided broadcast systems have already been addressed in the discussion of the terrestrial transmitting station so that they are not repeated here anymore.

It should be understood that it is preferred to provide several terrestrial transmitting stations receiving different local signals. In contrast to conventional systems, even with such a constellation, however, no destructive interaction of the combination signals emitted from the several terrestrial transmitting stations occurs, which may make the information transmitted in the basis layer of the hierarchical modulation unusable.

Further, it is preferred that satellite-aided broadcast system include a basis station, or a satellite basis station, designed to send a first basis station signal and a second basis station signal to the satellite, and that the satellite be designed to pass on the first basis station signal as a first satellite signal and the second basis station signal as a second satellite signal. In this context, the basis stations and the satellite are preferably designed such that the first satellite and the second satellite signal comprise the same payload data content and that the second satellite signal is delayed compared to the first satellite signal by a predetermined delay time. Thereby, it is allowed that, even if a delay time of the first terrestrial transmitting station is taken into account, the combination signal emitted from the first terrestrial transmitting station and the second satellite signal may overlay constructively. In other words, it is achieved by the design described that a satellite signal ingoing in the receiver and a combination signal (transmitted from the terrestrial transmitting station) ingoing in the receiver comprise the same data content at any time, and that the modulation contents of the satellite signal and the combination signal thus constructively overlay in the receiver.

Further, it is preferred that the second satellite signal comprise a greater signal strength (or be emitted from the satellite with a greater transmission power or an effective transmission power) than the first satellite signal. Thereby, the receiver is allowed to receive the second satellite signal also with a comparatively small antenna, such as may be deployed in a mobile device. For the first satellite signal, a smaller power is convenient since a comparatively high antenna overhead may be operated in some cases at the location of a terrestrial transmitting station so that also a comparatively weak first satellite signal may be received from a terrestrial transmitting station.

Finally, it is preferred that the first terrestrial transmitting station, the second terrestrial transmitting station and the satellite be designed such that the second satellite signal, the combination signal emitted from the first terrestrial transmitting station and the combination signal emitted from the second terrestrial transmitting station comprise the same carrier frequency and the same modulation type. Thereby, the second satellite signal and the combination signals emitted from the transmitting station are finally allowed to comprise a positive interference or to constructively overlay. Accordingly, a good reception may be guaranteed.

Further, it should be understood that it is advantageous if the satellite and the basis station are designed such that the second satellite signal contains an information only in the basis layer of the hierarchical modulation, while the combination signals (of the terrestrial transmitting stations) comprise information both in the basis layer and in the overlay layer of the combination signal. Thus, the use of the second satellite signal without an information content in the overlay layer prevents the second satellite signal from interfering with the information contained in the overlay layer of the combination signals of the terrestrial transmitting stations.

It should be understood that the use of the second satellite signal is optional. In some applications, a single signal emitted from the satellite is sufficient, wherein only a single basis station signal is then required. The single satellite signal present in this case may then be used by both the terminals and the terrestrial transmitting station, or the terrestrial transmitting stations.

The present invention further provides a receiving means for receiving a signal emitted from a terrestrial transmitting station. The receiving means includes a receiver for receiving the combination signal emitted to obtain a receive signal. The receiver further includes a decoder for decoding the receive signal using hierarchical modulation, whereby the decoder may obtain a binary group for a modulation symbol. The receiving means further includes a data splitter for splitting a first group of bits from the binary group so that the first group of bits describes the basis layer of the satellite signal. The data splitter is further designed to obtain a second group of bits from the binary group describing the overlay layer of the hierarchical modulation of the satellite signal, or being associated with the overlay layer of the hierarchical modulation.

In other words, the inventive receiving means is designed to split the combination signal into a first part (the first group of bits) and a second part (the second group of bits), the first part including the information contained in the satellite signal and the second part including the information contained in the local signal. In other words, the inventive receiving means is able to receive both the information of the satellite signal and the information of the local signal separately.

Further, it should be understood that the inventive receiving means is also able to guarantee a reception free of interference also in situations in which both the satellite signal and the combination signal are received from the terrestrial transmitting station.

Finally, it is preferred to provide, in an inventive receiving means, two means for channel decoding comprising different code rates and to apply the first channel decoding means with the greater code rate to the first group of bits and to apply the second decoding means with the smaller code rate to the second group of bits. Thereby, it may be accomplished that a bitstream gained from the first group of bits by help of the first channel decoding means (also referred to as channel decoder) comprises a first bit error rate similar to a second bit error rate of a bitstream gained from the second group of bits by help of the second channel decoding means.

BRIEF DESCRIPTION OF THE DRAWINGS

Preferred embodiments of the present invention are described in the following in detail with reference to the accompanying drawings, in which.

Figure 1:
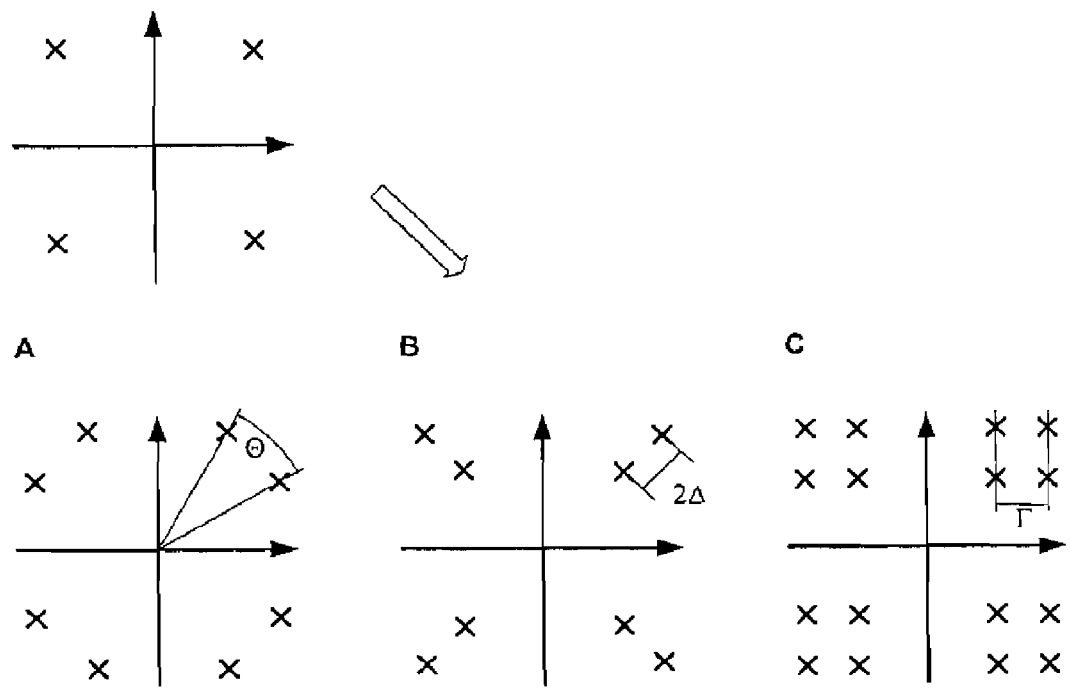
FIG. 1 shows a principle illustration of a hierarchical modulation.
Figure 2:
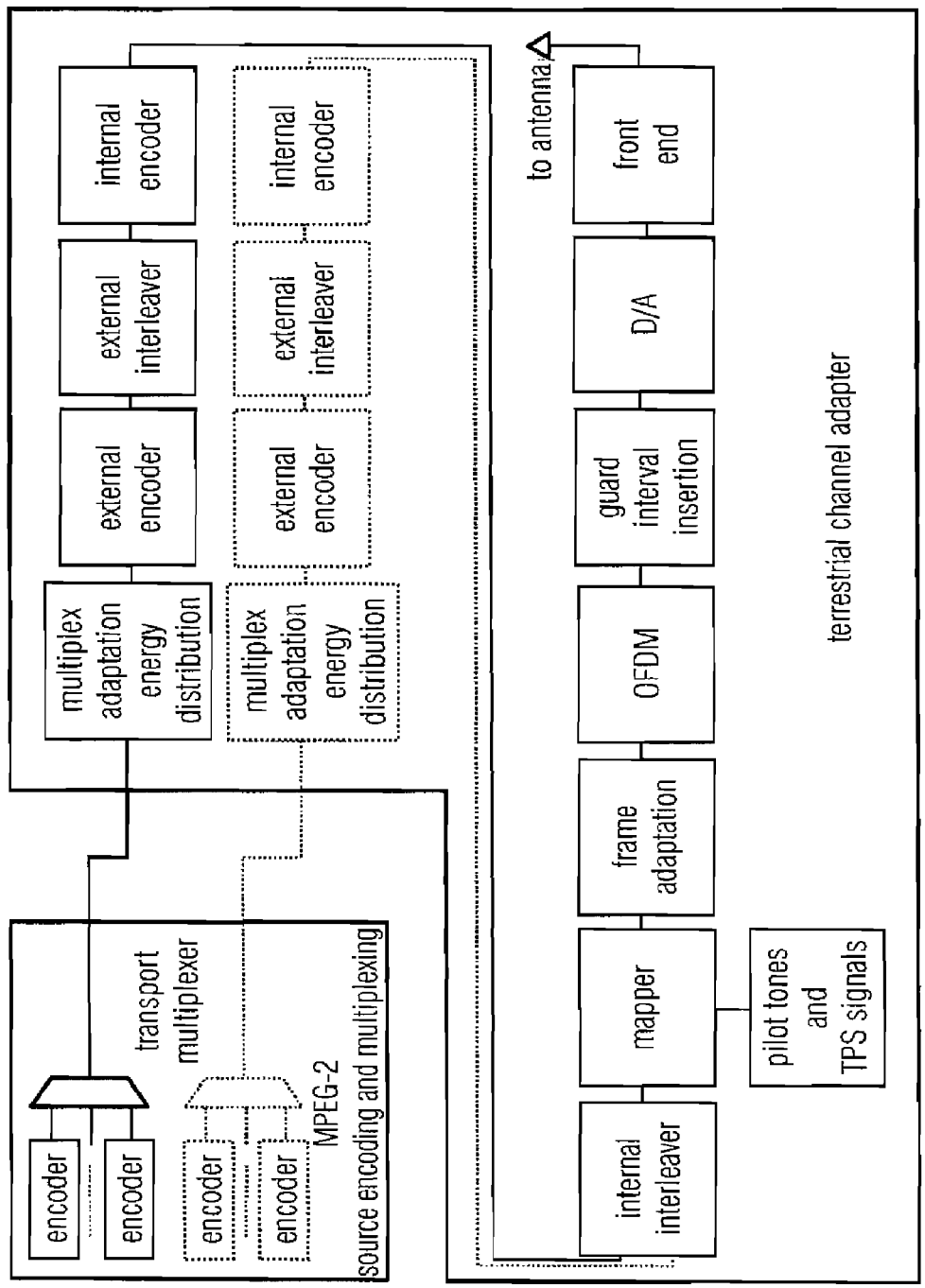
FIG. 2 shows a block diagram of the DVB-T encoder.
Figure 3A:
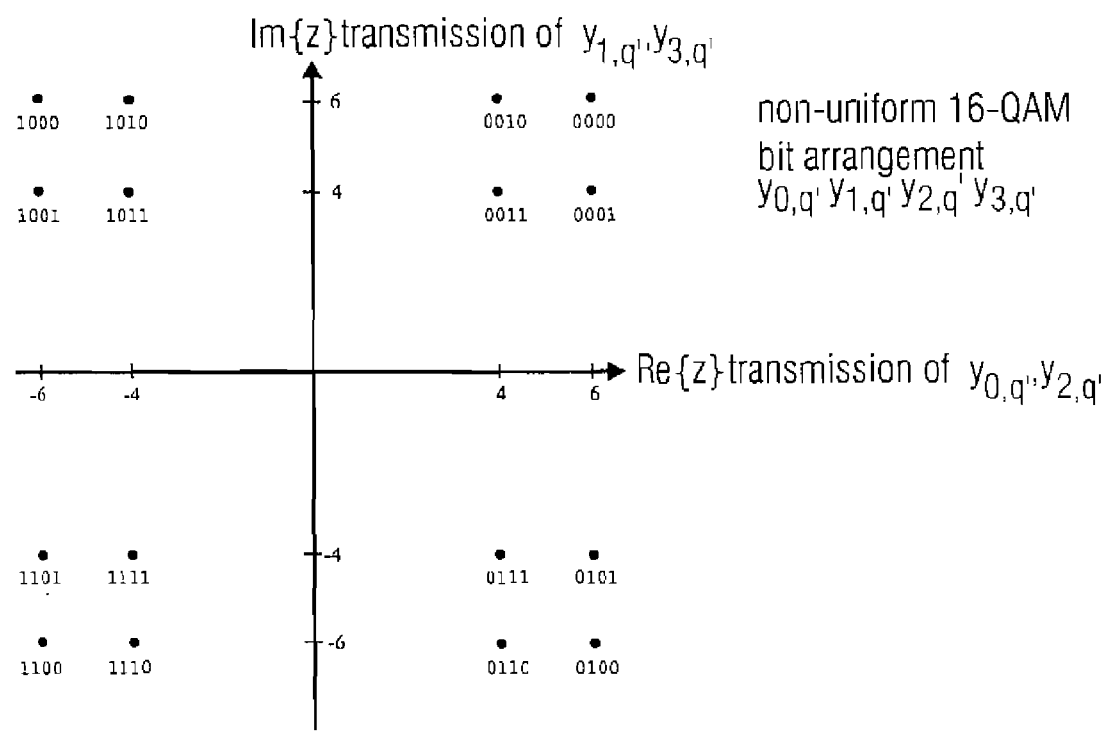
FIG. 3a shows a constellation diagram of a non-uniform 16-QAM modulation.
Figure 3B:
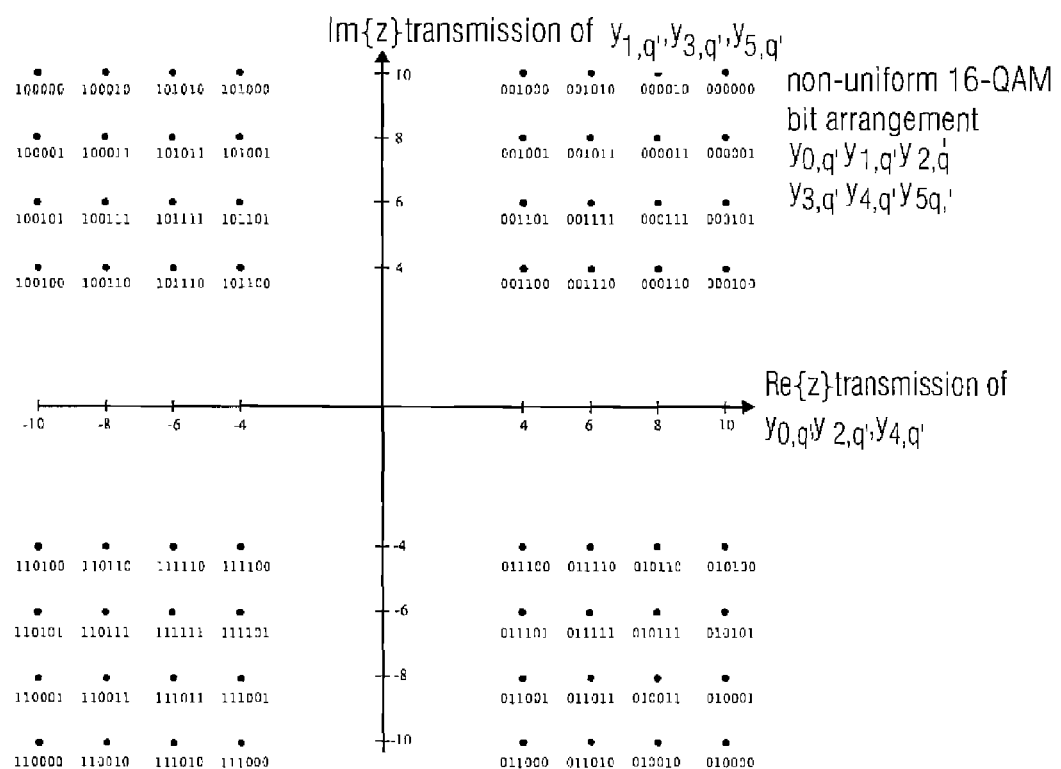
FIG. 3b shows a constellation diagram of a non-uniform 64-QAM modulation.
Figure 4:
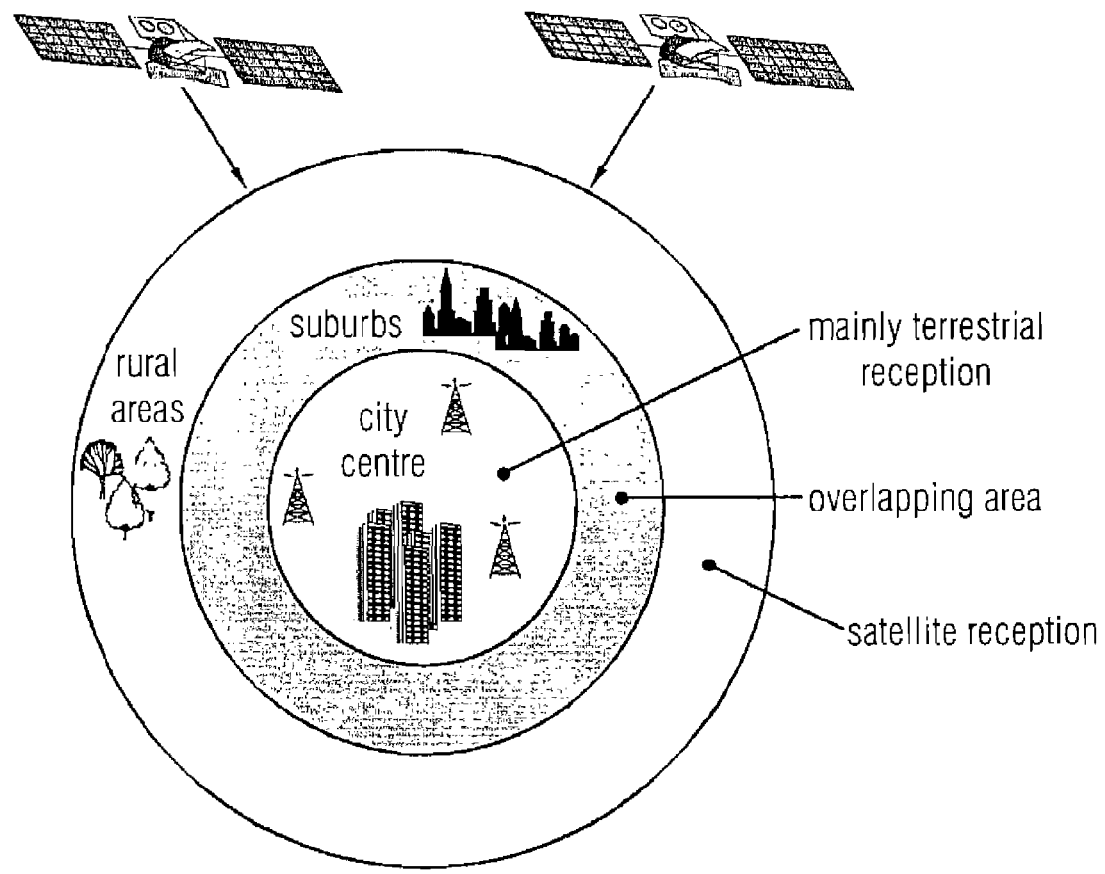
FIG. 4 shows a principle illustration of a hybrid system.
Figure 5:
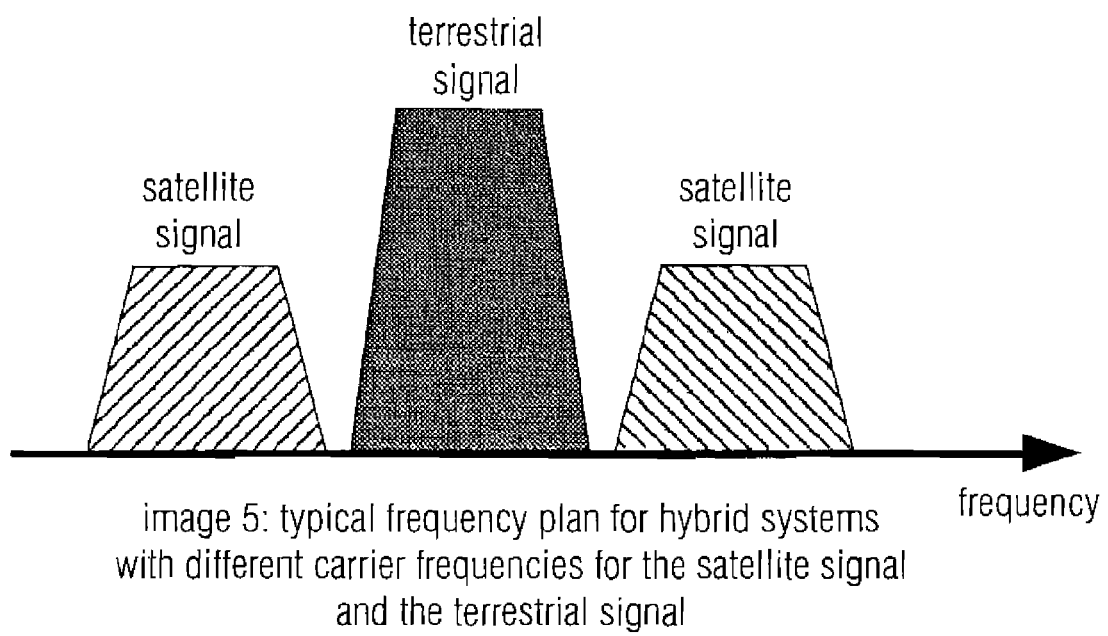
FIG. 5 shows a graphical illustration of a typical frequency plan of a hybrid system with different carrier frequencies for a satellite signal and a terrestrial signal.

DETAILED DESCRIPTION 8 shows a high-level block diagram of an inventive terrestrial transmitting station according to a first embodiment of the present invention. The transmitting station shown in FIG. 8 is, as a whole, designated 100.

The transmitting station includes a first receiver 110 receiving a satellite signal 112 and generating, based on the satellite signal 112, a satellite receive signal 114. The transmitting station 100 further includes a second receiver 120 receiving a local signal 122 and generating on the basis thereof a local receive signal 124. The transmitting station 100 further includes a signal combiner 130 receiving the satellite receive signal 114 and the local receive signal 124 and forming a combination signal 140 on the basis thereof. The transmitting station 100 further includes a transmitter 150 receiving the combination signal 140 and generating a transmit signal 160. The transmit signal 160 may be supplied to a transmit antenna, for example, here not shown.

On the basis of the structural description, the functioning of the transmitting station 100 will be described in the following. The signal combiner 130 is designed to combine the satellite receive signal 114 and the local receive signal 124. The signal combiner 130 is designed to form the combination signal 140 such that the combination signal is formed according to a hierarchical modulation. In this context, the satellite receive signal in the combination signal is contained in a basis layer of the hierarchical modulation, while the local receive signal in the combination signal 140 is contained in an overlay layer of the hierarchical modulation.

Figure 8:
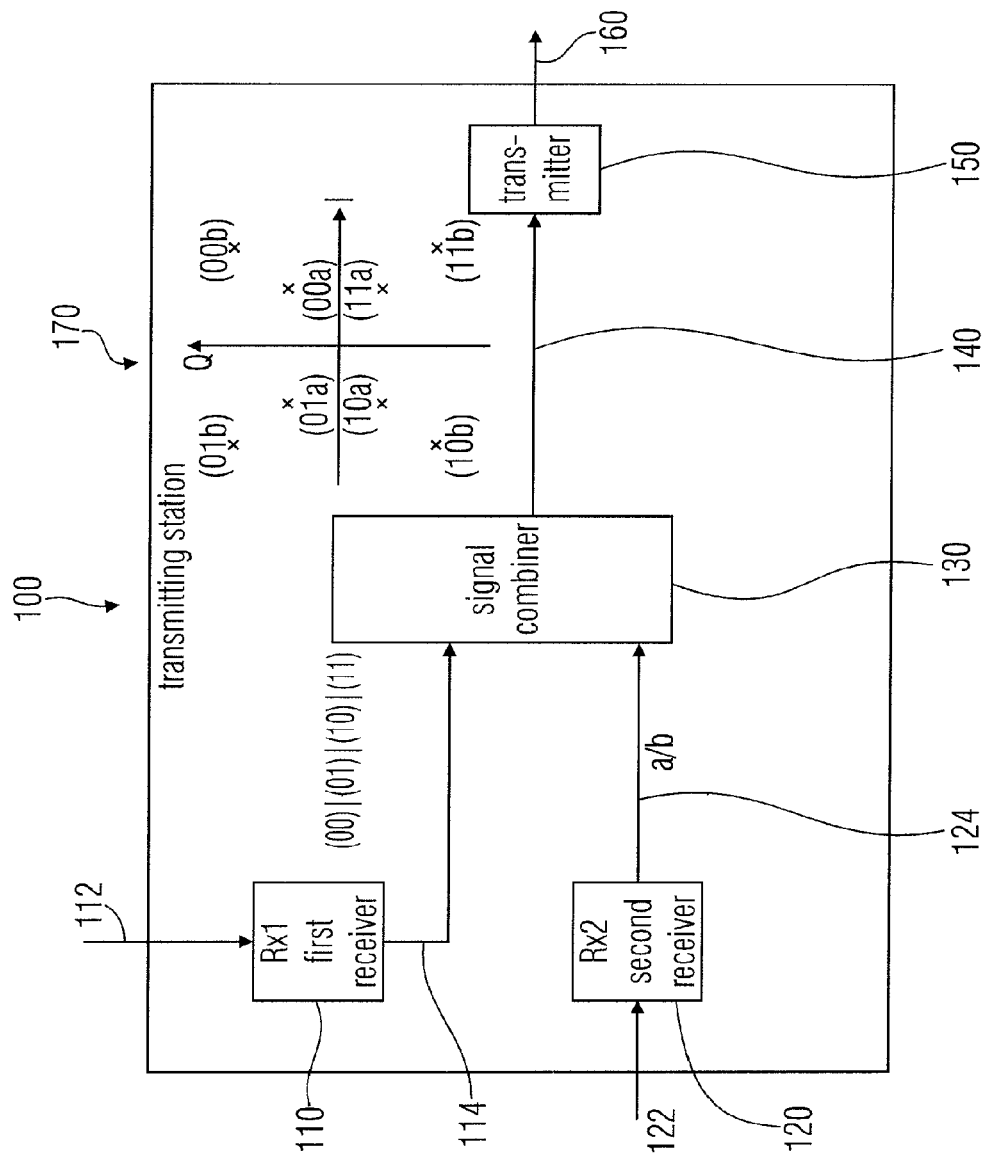
FIG. 8 shows a high-level block diagram of an inventive transmitting station according to a first embodiment of the present invention.

For explanation, the block diagram of FIG. 8 shows an exemplary constellation diagram 170 showing, at an abscissa, an in-phase portion (I) of a modulation symbol (or a complex modulation signal) and, at an ordinate, a quadrature portion (Q) of the (complex-valued) modulation symbol. It should be noted that the in-phase portion may also be regarded as a real part of the complex modulation symbol and the quadrature portion may also be regarded as an imaginary part of the complex modulation symbol. Thus, the combination signal 140 represents a complex-valued modulation signal supplied to the transmitter 150. In this context, it is assumed that the transmitter 150 takes on the modulation, that is, generates a modulated transmit signal 160 on the basis of the complex-valued modulation signal 140.

For understanding the constellation diagram 170, it shall further be explained that in this context, it is exemplarily assumed that the satellite receive signal 114 includes two bits per data symbol so that the satellite receive signal (in a step, or in a clock period) may only assume the four values (00), (01), (10) and (11). In this context, it is further assumed that the local receive signal 124 may assume two values per data symbol, which are here designated with a and b (the values a and b, however, were only used for improving clarity of the constellation diagram 170, where a=0 and b=1 may be valid or reverse, for example).

The signal combiner 130 is preferably designed to form, on the basis of the satellite receive signal 114 and the local receive signal 124, the combination signal 140 formed according to a hierarchical modulation. The data symbol of the satellite signal (00), (01), (10) or (11) in this context determines the "approximate" location of a modulation symbol (x) in the constellation diagram, in the manner shown by way of example in the constellation diagram 170. In other words, the data symbol of the satellite signal 114 is associated with the basis layer of the hierarchical modulation. In contrast, the data symbol (a or b) of the local receive signal 124 determines the "accurate" location of the modulation symbol (x) in the constellation diagram 170. In other words, the data symbol of the local receive signal 124 is associated with the overlay layer of the hierarchical modulation.

In other words, the data symbol of the satellite receive signal 114 is already known from the "approximate" location of the combination signal 140 in the constellation diagram. Thus, in the example shown, it is sufficient, for example, to determine in a receiver (here not shown) the quadrant of a constellation diagram in which the combination signal 140 is located to be able to conclude the data symbol of the satellite receive signal 114. If the location of the modulation symbol is known in more detail, the associated data symbol (a or b) of the local receive signal 124 may be additionally established.

The use of an inventive transmitting station shown brings about substantial advantages. A satellite receive signal 114 and the local receive signal 124 may be combined by the signal combiner 130 such that a combination signal 140 with a hierarchical modulation develops. The base layer of the hierarchical modulation of the combination signal 140 in this context is established by the satellite receive signal 114, or the satellite signal 112.

The particular advantages of the inventive transmitting station will become apparent if it is assumed that two transmitting stations 100 of the same kind are adjacent such that both transmitting stations 100 may be received in an overlap area. It is further assumed that both the transmitting stations receive the same satellite signal 112, but different local signals 122. In this case, the basis layer of the hierarchical modulation of the combination signals 140 is identical for both transmitting stations 110. The transmit signals 160 of both the transmitting stations 100 thus differ only with respect to the overlay layer of the hierarchical modulation. If, however, two signals overlay (for example, in the spatial overlap area), which do not differ with regard to the basis layer of a hierarchical modulation, the basis layer of the hierarchical modulation is not subjected to any interference by the overlay. In other words, in the presumed overlap area two transmitting stations 100, the information contained in the basis layer of the hierarchical modulation is further detectable without interferences. Only the information contained in the overlay layers of the hierarchical modulation (of both of transmitting stations) is disturbed by the overlay. Thus, a receiver located in the overlay area, or the overlap area, may receive at least the information contained in the basis layer without any signal interference.

Further, it should be understood that the inventive transmitting station may combine the contents of a satellite signal 112 with the contents of a local signal 122 and transmit a corresponding combination signal 140 in a very efficient manner. In this context, it should further be understood that the inventive transmitting station combines the satellite receive signal 114 and the local receive signal 124 with each other in a particularly frequency-efficient manner.

It should further be understood that the use of a hierarchical modulation allows to overlay a signal modulated according to the basis layer of the hierarchical modulation with additional information defined by the overlay layer of the hierarchical modulation, without such an overlay having to be explicitly provided by the original signal. This is in contrast to other methods, such as methods with time slots, in which an addition of information is only possible if a free time slot exists in the original signal. In a similar manner, a free frequency channel must be provided in an original signal when deploying frequency-multiplex methods, so as to be able to add additional information to the original signal. In this, the inventive transmitting station substantially differs from known terrestrial transmitting stations.

Further, it should be understood that an overlay of the transmit signal 160 and the satellite signal 112 when using of an inventive transmitting station 110 does not lead to interferences even if the satellite signal 112 and the transmit signal 160 comprise the same carrier frequencies, wherein it is presumed that the satellite signal is modulated according to the basis layer of the hierarchical modulation. In this case, the transmitting station 110 adds only one overlay layer of the hierarchical modulation to the satellite signal 112, which in turn is insensitive to overlays with the actual satellite signal 112.

In this context, however, it is assumed that the satellite signal 112 and the transmit signal 160 enter a receiver simultaneously, which may be achieved, for example, if there is only small delay in the transmitting station 100. Further, it is assumed that the satellite signal 112 is modulated according to a basis layer constellation diagram which is compatible with the overlay layer constellation diagram used for generating the combination signal 140.

Figure 9:
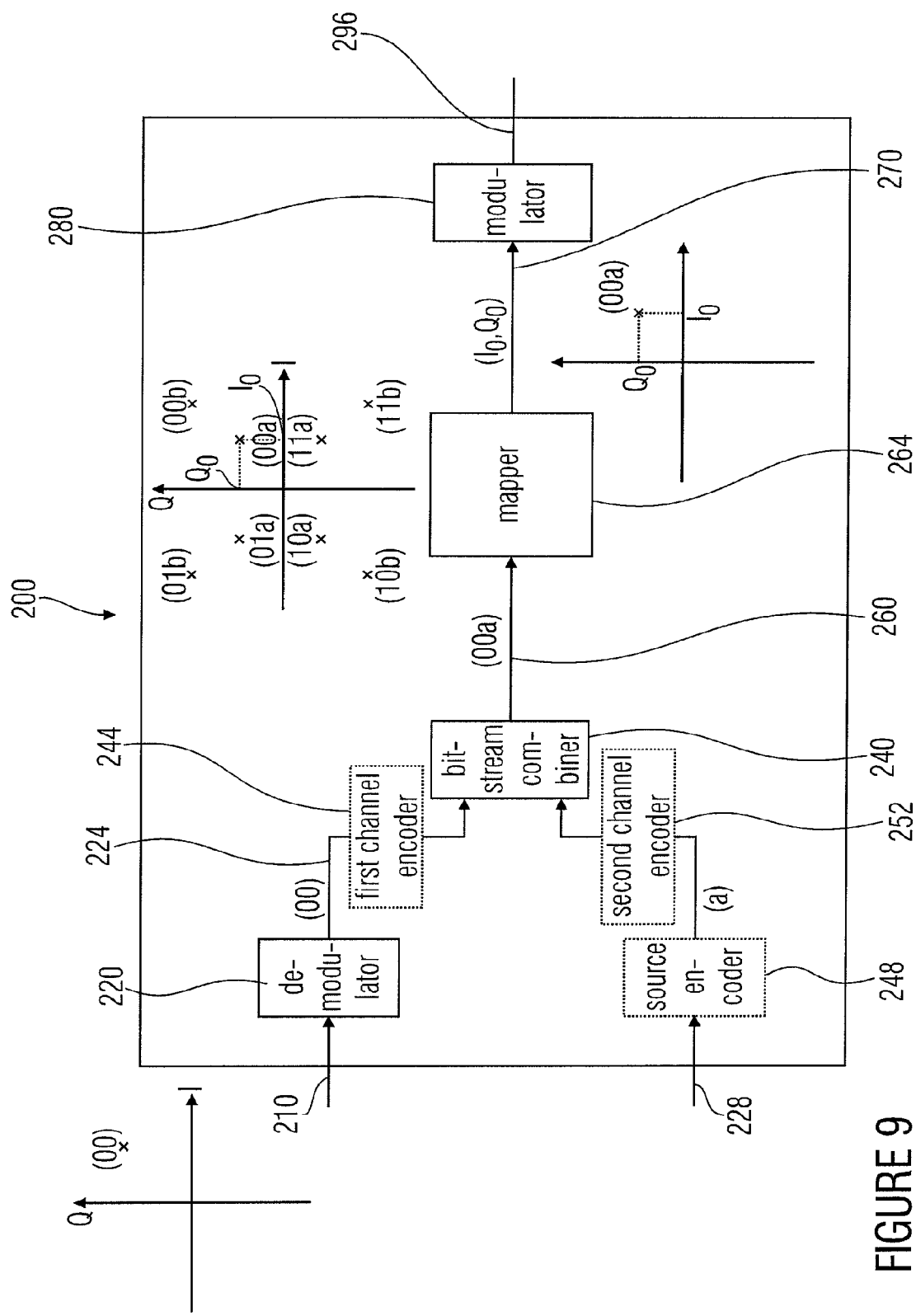
FIG. 9 shows an extract of a detailed block diagram of an inventive transmitting station according to a second embodiment of the present invention.

FIG. 9 shows an extract of a detailed block diagram of an inventive transmitting station according to a second embodiment of the present invention. The extract of the block diagram shown in FIG. 9 is, as a whole, designated 200. A modulated satellite signal 210 which may already be present in an intermediate frequency level or in a base-band level is supplied to the shown section from a block diagram of a transmitting station. The modulated satellite signal 210 is supplied to a demodulator 220. The demodulator 220 provides a bitstream 224 of data symbols, which may each comprise 2 bits ((00), (01), (10), (11)), for example. Further, the shown section 200 of the transmitting station receives a bitstream 228 of data symbols, which is derived from the local signal 122. The bitstream 224 associated with the satellite signal 112 is either directly supplied to a bitstream combiner 240 or passes through an optional first channel encoder 244. The bitstream 228 of data symbols which is based on the local signal is also supplied to the bitstream combiner 240 and in this process, optionally passes through an encoder, or a source encoder 248, and/or a second channel encoder 252. The bitstream combiner 240 combines the data symbols of the first bitstream 224 of data symbols (e.g. the data symbol (00)) with the data symbols of the second bitstream 228 of data symbols (e.g. the data symbol a) to a combined bitstream 260 of data symbols (e.g. to the data symbol (00a)). In this context, an optional source encoding (in the source encoder 248) and/or an optional channel encoding (in the channel encoder 252) is not excluded. The bitstream 260 of combined data symbols is subsequently supplied to a mapper 264 mapping the combined data symbols (e.g. the data symbol (00a)) onto modulation symbols which may be described by an in-phase component (I) and a quadrature component (Q), for example. In other words, the mapper 264 maps the combined data symbols of the bitstream 260 of combined data symbols onto a sequence of modulation symbols (e.g. onto the modulation symbol (I0, Q0)). In this context, the modulation symbols are regarded as complex-valued magnitudes with an in-phase portion (I) and a quadrature portion (Q) and, thus, form a combination signal 270. The complex combination signal 270 is then supplied to a modulator 280 which is part of the transmitter, for example, and which forms a modulated combination signal 290 associated with the modulation symbols of the complex combination signal 270. Thus, the modulated combination signal 290 is a real-valued time signal and may be emitted from the transmitting station, for which purpose a further frequency translation (by means of a mixer) to a carrier frequency as well as a signal amplification (e.g. by means of a power amplifier) may be required.

Thus, it may be established altogether that in the embodiment shown, both the satellite signal and the local signal are demodulated such that the bitstreams 224, 228 of data symbols develop. The bitstreams may then be subjected to a source encoding and/or a channel encoding and finally are combined in the bitstream combiner 240 to combined data symbols on the basis of which modulation symbols are then generated by a mapping. Thus, the generation of a hierarchical modulation may completely be performed on the level of signal digital processing, wherein the mapper 264 is used to map the combined data symbols onto modulation symbols of the overlay layer of the hierarchical modulation.

Using a source encoder 248 for a source enencoding of the bitstream 248 of data symbols belonging to the local signal is advantageous since typically only a comparatively small bit rate of payload bits (related to the basis layer) may be transported in the overlay layer of the hierarchical modulation. The overlay layer of the hierarchical modulation is more susceptible to channel-related interferences since the modulation symbols of the overlay layer in a constellation diagram typically have a smaller distance than the modulation symbols in the basis layer. It is, therefore, recommended to apply, in a channel encoder 252, a channel encoding with a low code rate (lower than the code rate of the information transmitted in the basis layer) to the bitstream 228 of data symbols associated with the local signal and transmitted in the overlay layer of the hierarchical modulation.

Optionally, a channel enencoding may be added in the first channel encoder 244 to the bitstream 224 of data symbols belonging to the satellite signal, wherein, however, the code rate of the first channel encoder 244 is chosen significantly greater than the code rate of the second channel encoder 252.

Figure 10:
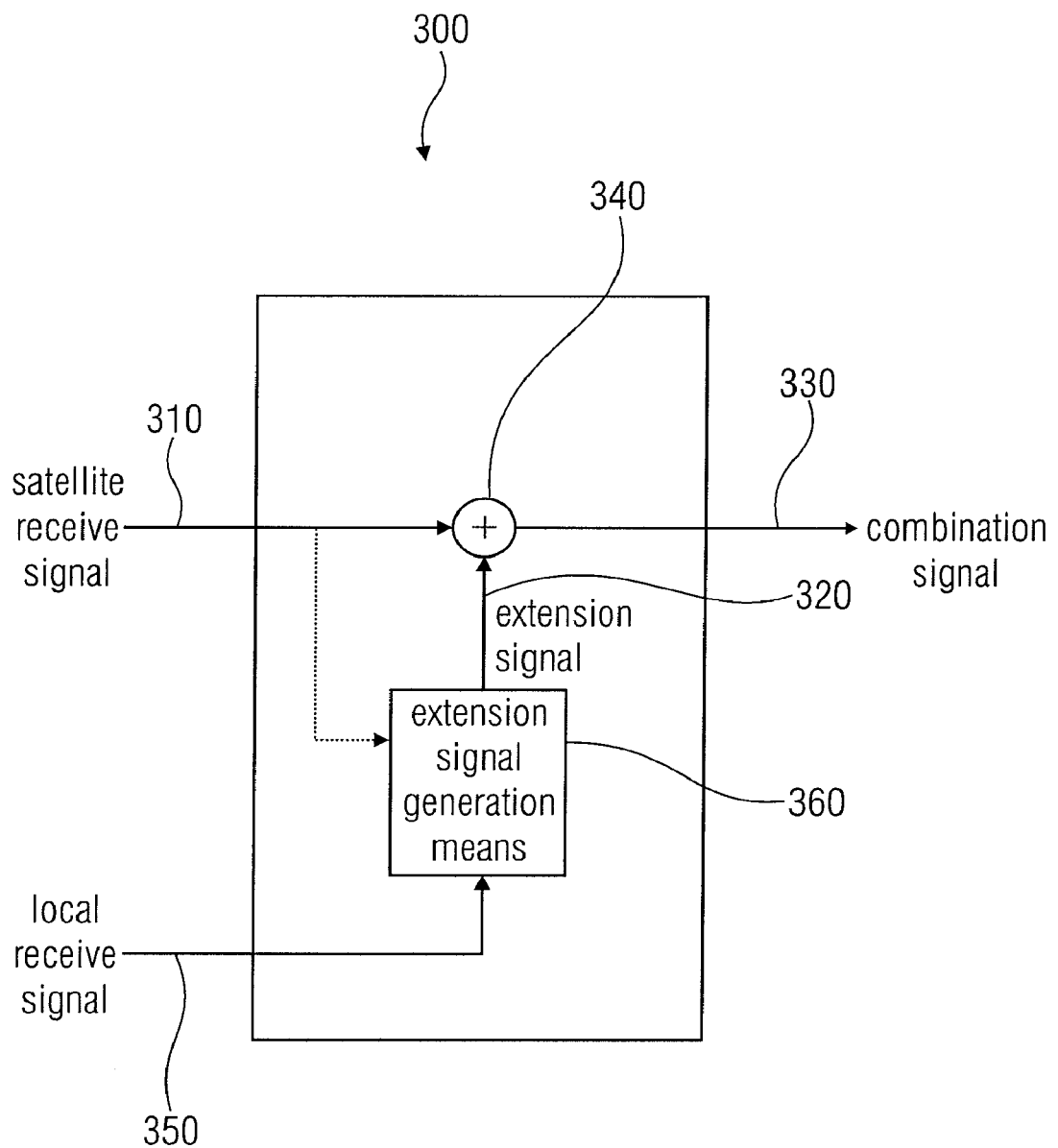
FIG. 10 shows an extract of a detailed block diagram of an inventive transmitting station according to a third embodiment of the present invention.

FIG. 10 shows an extract of a detailed block diagram of an inventive transmitting station according to a third embodiment of the present invention. The extract of the block diagram shown in FIG. 10 is, as a whole, designated 300 and describes a circuitry by help of which a satellite receive signal 310 may be overlaid with an extension signal 320 so that a combination signal 330 develops formed according to a hierarchical modulation. In this context, it is assumed that the satellite receive signal 310 is an analog signal modulated according to a basis layer of the hierarchical modulation. A transition of the basis layer of the hierarchical modulation to the overlay layer of the hierarchical modulation may be accomplished by adding, in an adder 340, the extension signal 320 to the satellite receive signal 310, whereby the combination signal 330 develops. The extension signal 320 is generated in an extension signal generation means 360, dependent upon data symbols of the local receive signal 350.

Dependent upon a data symbol of the local receive signal 350, the extension signal generation means 360 may, for example, generate a signal whose amplitude and/or phase is dependent upon the data symbols of the local signal/receive signal 350.

Further, it should be noted that the extension signal generation means 360 may also evaluate the satellite receive signal 310 apart from the local receive signal 350 to ascertain the corresponding data symbols, an amplitude or a phase location, for example, of the satellite receive signal 310 and to involve them into the generation of the extension signal 320.

Thus, it is shown that it is possible to generate the combination signal 330 formed according to the overlay layer of the hierarchical modulation not only in a digital manner (such as described referring to FIG. 9), but also with an analog circuitry. Thus, it is not necessarily required to form a bitstream from the satellite receive signal 310 by complete demodulation. Rather, an extension signal 320 may be added to the non-demodulated satellite receive signal 310 modulated according to the basis layer of the hierarchical modulation so that the developing combination signal 330 is modulated according to the overlay layer of the hierarchical modulation.

Figure 11:
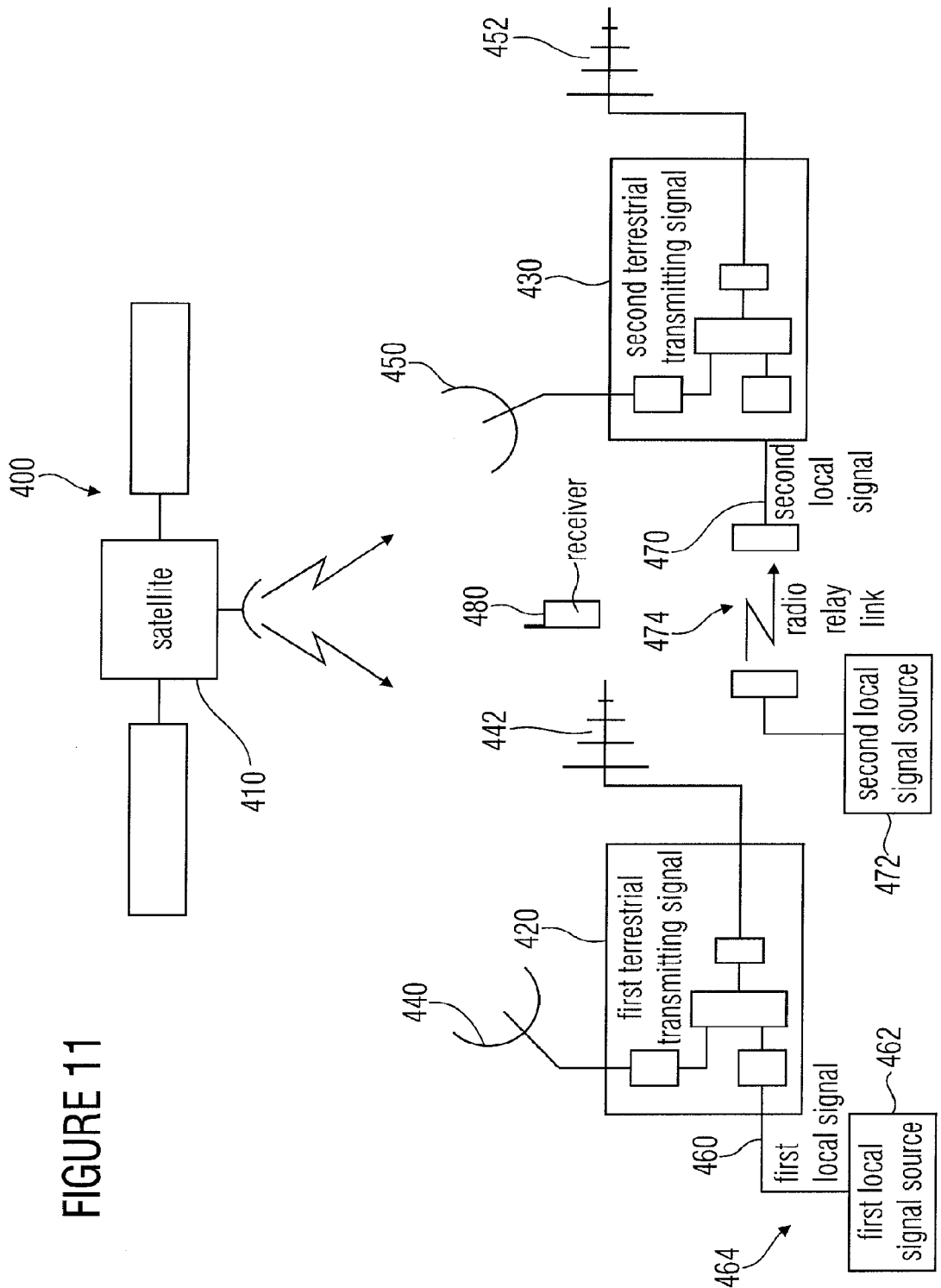
FIG. 11 shows a schematical illustration of an inventive satellite-aided broadcast system according to a fourth embodiment of the present invention.

FIG. 11 shows a schematic illustration of an inventive satellite-aided broadcast system according to a fourth embodiment of the present invention. The satellite-aided broadcast system shown in FIG. 11 is, as a whole, designated 400.

A satellite 410 which is in connection with a first terrestrial transmitting station 420 and a second terrestrial transmitting station 430 is the core of the satellite-aided broadcast system 400. The terrestrial transmitting stations 420, 430 correspond to the terrestrial transmitting stations 100 described referring to FIG. 8 and may also comprise the structures 200, or 300, for example, described with referring to FIG. 9 or 10.

FIG. 11 further shows that the first terrestrial transmitting station 420 may include a first satellite antenna 440 designed to receive a satellite signal emitted from the satellite 410 and supply it to the first receiver of the first transmitting station 420. Further, a first terrestrial antenna 442 is coupled to the transmitter of the first terrestrial transmitting station 420. Similarly, the second terrestrial transmitting station 430 is coupled to an associated second satellite antenna 450 to receive the satellite signal emitted from the satellite 410. Further, the second terrestrial transmitting station 430, too, is connected, on the output side thereof, to a terrestrial transmitting antenna 452.

Further, it should be understood that a first local signal 460 is supplied to the first terrestrial transmitting station 420 from a first local signal source 462 via a wire-connected connection 464. The term "local signal" in this context expresses that the corresponding signal is not supplied to the second receiver of the first terrestrial transmitting station 420 from a satellite, but via another connection, that is, via a wire-connected connection, an optical waveguide connection or a terrestrial radio relay link, for example. FIG. 11 further shows that an associated second local signal 470 is supplied to the second transmitting station 430 from a second local signal source 472 via a radio relay link 474.

Depending upon the application, a carrier frequency at which the combination signal of the first transmitting station 420 is emitted via the first terrestrial antenna 442 may be equal to a carrier frequency of the satellite signal or may be differ from it. The same applies to the carrier frequency of the combination signal emitted from the second transmitting station 430 via the second terrestrial antenna 452.

Apart from that, the carrier frequencies of the combination signal emitted by the first transmitting station and the combination signal emitted by the second transmitting station 430 may be the same. An interesting and technically advantageous special case occurs, when the carrier frequencies of the satellite signal and the carrier frequencies of the combination signal emitted from the first transmitting station 420 and the combination signal emitted from the second transmitting station 430 are the same. Thus, a receiver 480 may, if applicable, receive at least the satellite signal and the signal emitted from the first transmitting station 420. As, however, the combination signal emitted from the first transmitting station 420 is preferably equal to the satellite signal apart from an additional overlay signal, the receiver 480 may still receive the information contained in the signals undisturbedly. Likewise, the receiver may receive at least the information contained in the base layer of the hierarchical modulation undisturbedly, when it receives the combination signals of both terrestrial base stations.

Figure 12:
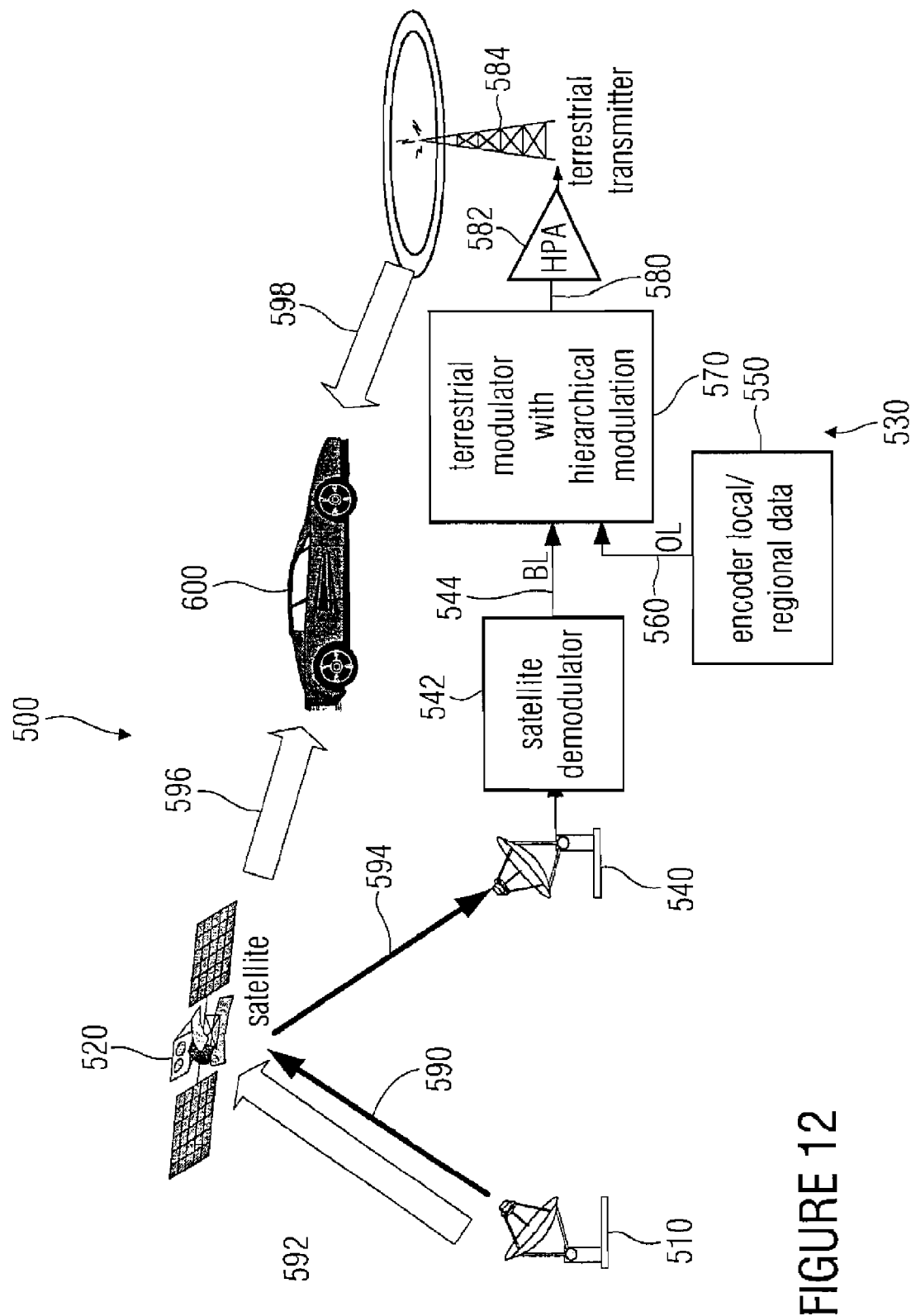
FIG. 12 shows a schematical illustration of an inventive satellite-aided broadcast system according to a fifth embodiment of the present invention.

FIG. 12 shows a schematical illustration of an inventive broadcast system according to a fifth embodiment of the present invention. The satellite-aided broadcast system illustrated in FIG. 12 is designated by 500 in its entirety. The system includes a satellite base station 510, a satellite 520 and a terrestrial transmitting station 530. The terrestrial transmitting station 530 includes a satellite receive antenna 540 which supplies a receive signal to a receiver 542. The receiver typically converts the signal provided by the satellite receive antenna 540 onto an intermediate frequency or into the baseband and then performs a demodulation to obtain a satellite receive signal 544. Further, a local data source 550 provides local or regional data. The transmitting station 530 may here contain an encoder which subjects the data provided by the local data source 550 to a source encoding. Thus, a local receive signal 560 results. The transmitting station 530 further includes a terrestrial modulator 570 with a hierarchical modulation. The terrestrial modulator 570 supports the hierarchical modulation, wherein the hierarchical modulation provides a base layer and an overlay layer. Accordingly, the terrestrial modulator 570 comprises a first input BL receiving the data for the base layer. The second input OL of the terrestrial modulator 570 receives the data for the overlay layer. The input BL of the terrestrial modulator for the data of the base layer is here coupled to the satellite demodulator 542 and consequently receives the satellite receive signal 544. The input OL of the terrestrial modulator 570 for the signal associated with the overlay layer is connected to the encoder or to the local data source 550, respectively, and thus consequently receives the local receive signal 560. The terrestrial modulator generates a combination signal 580 which is modulated according to the hierarchical modulation, wherein the satellite receive signal provided by the satellite demodulator 542 acts on the base layer of the terrestrial modulator 570, while the local receive signal 560 acts on the overlay layer of the terrestrial modulator 570 or the hierarchically modulated combination signal 580. The hierarchically modulated combination signal 580 is then supplied to a power amplifier 582 and emitted via a terrestrial transmit antenna 584.

It is further to be noted, that preferably the satellite base station 510 sends out a first base station signal 590 and a second base station signal 592 to the satellite 520. The satellite passes the first base station signal 590 on as a first satellite signal 594 with a comparatively low transmitting power (e.g. using a transponder or a repeater, respectively). The first satellite signal 592 thus comprises a comparatively low power and is formed to be received by a satellite receive antenna 540 of a terrestrial transmitting station 530. The first satellite signal 594 is typically so weak that it may not be received using small antennas, as they are used in portable devices. The satellite 520 further also passes on the second base station signal 592 as a second satellite signal 596, wherein the second satellite signal 596 is emitted with a substantially greater transmitting power (or effective transmitting power, respectively) than the first satellite signal 594. Preferably, a transmitting power of the second satellite signal 596 is greater by at least 10 decibel than a transmitting power of the first satellite transmit signal 594. The second satellite signal 596 is intended to be received at a consumer terminal device and is preferably implemented so that it may also be received by a mobile terminal device having a correspondingly small antenna comprising an antenna gain of less than 15 dBi.

Apart from that it is to be noted, that the second satellite signal 596 is preferably delayed by a predetermined time period compared to the first satellite signal 594 so that a terrestrial transmit signal 598 emitted from the terrestrial transmitting station 530 arrives at a receiver approximately simultaneously to the second satellite signal 596. The delay of the second satellite signal 596 compared to the first satellite signal 594 may either be given by the design of the satellite 520 or by the design of satellite base station 510.

The corresponding time delay hereby compensates the delays occurring in the transmitting station 530 and is typically in a range of between 0 and 50 ms. It is further possible that the terrestrial transmitting station 530 includes a delay means (not shown) which is implemented to guarantee that the second satellite signal 596 and the terrestrial transmit signal 598 arrive at a predetermined location with the same phase. The corresponding delay means may preferably be implemented to be adjustable, wherein the adjustment may be performed manually. Further, also by a continuous monitoring of the phase shift between the second satellite signal 596 and the terrestrial transmit signal 598 a correction information may be generated at the predetermined location which may serve for a dynamic adjustment of the described delay means within the scope of a locked loop. Further, the adjustment of the delay means may be accomplished using time information transmitted with the first satellite signal 594 or with the second transmit signal 596.

Figure 6:
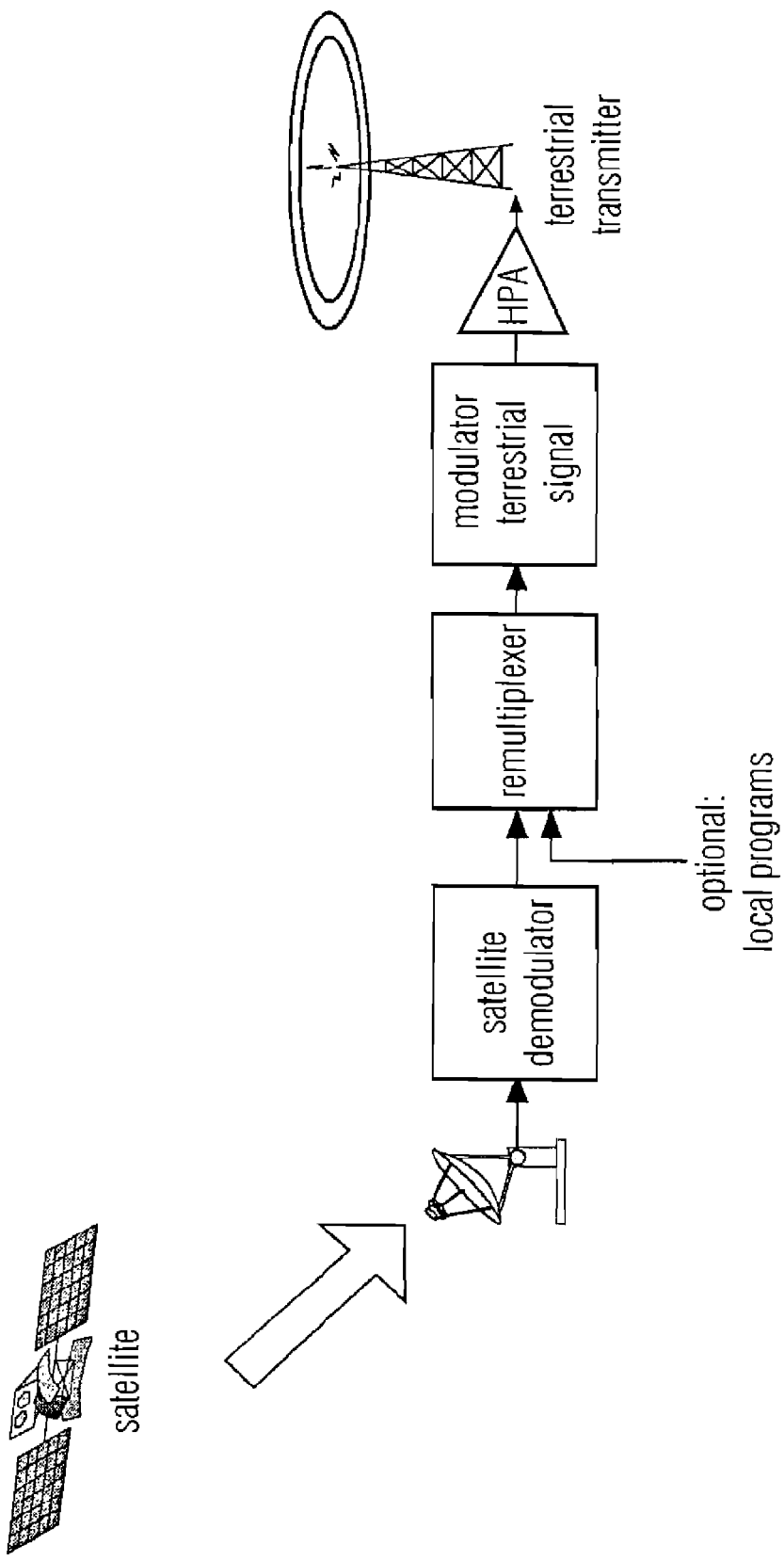
FIG. 6 shows a block diagram of a transmitter architecture of a hybrid system with transencoding.
Figure 7A:
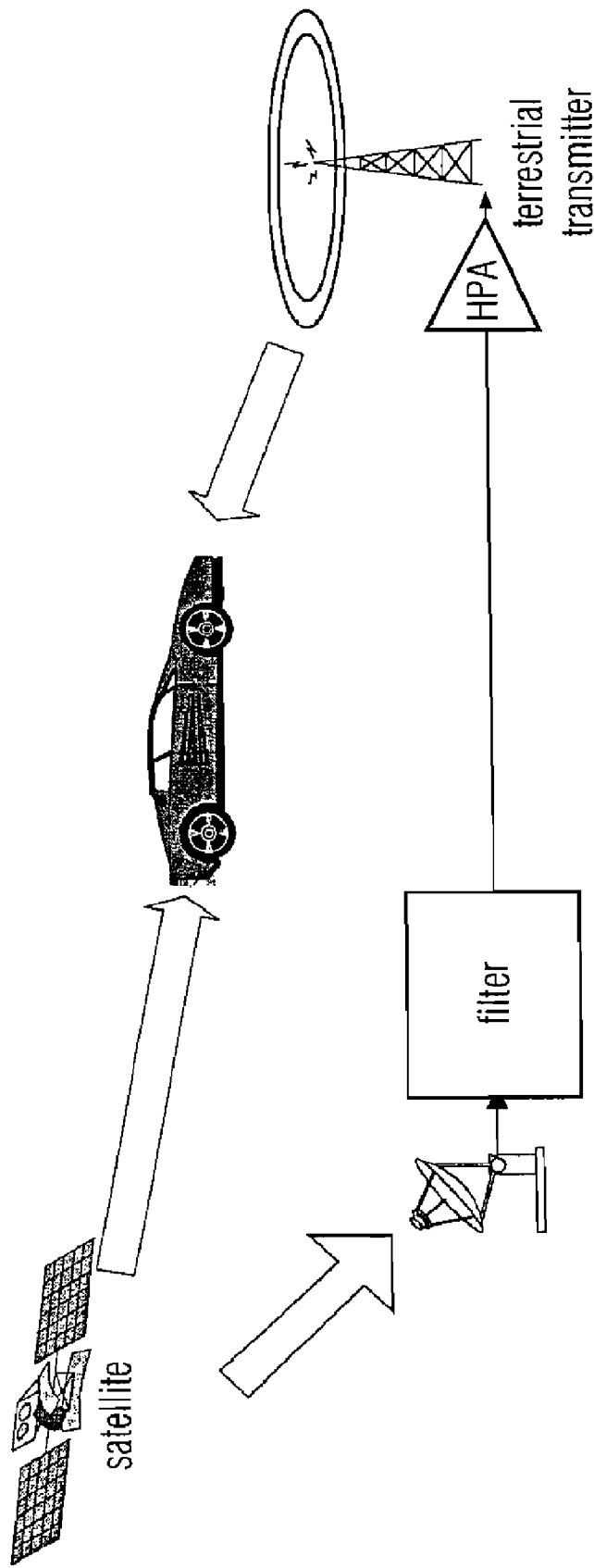
FIG. 7a shows a schematic illustration of a first satellite system with GAP fillers.
Figure 7B:
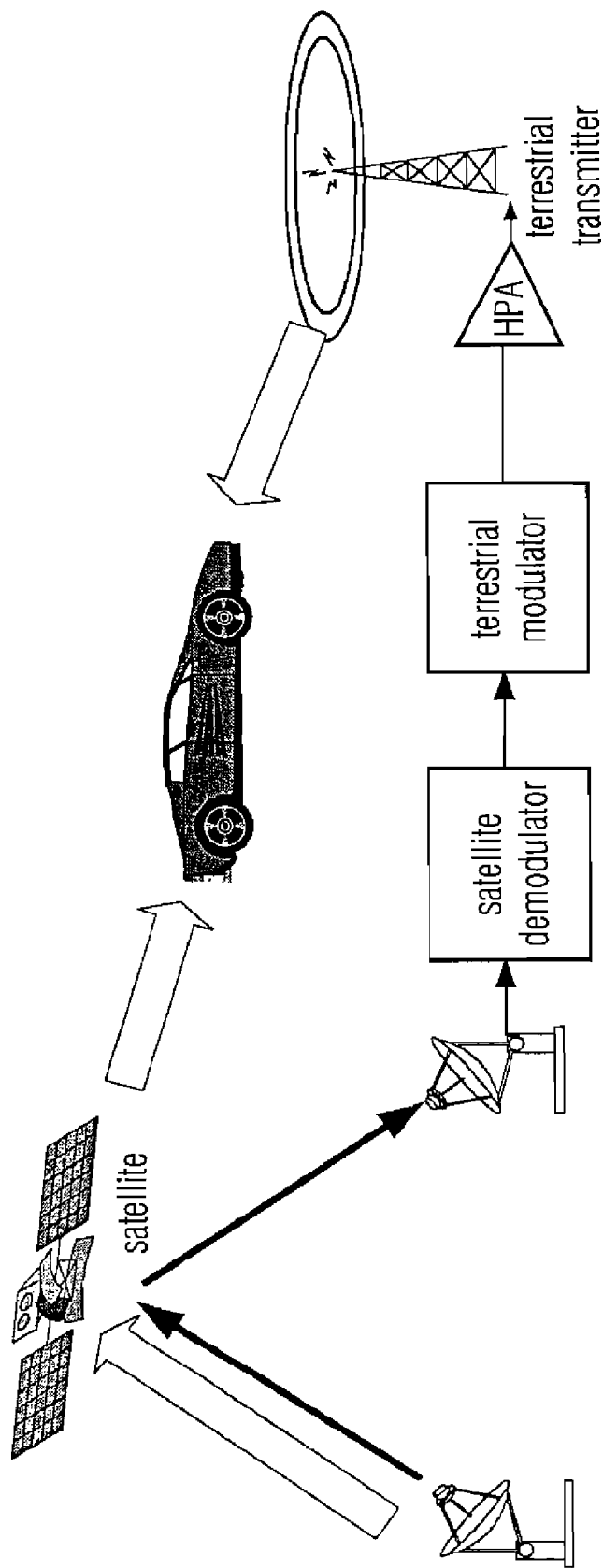
FIG. 7b shows a graphical illustration of a second, expanded satellite system with GAP fillers.

In summary it may be said, that the inventive satellite-aided broadcast system 500 comprises an architecture which is different from the architectures illustrated in FIGS. 6, 7a and 7b. In the inventive, satellite-aided broadcast system 500 local information is added as hierarchical information (by use of a hierarchical modulation). Further, in contrast to the system illustrated in FIG. 6 for the terrestrial transmit signal 598 and the second satellite signal 596 the same carrier frequency may be used. Apart from that, information provided by the local information source 550 may be different for each transmitter (from a plurality of transmitting stations).

It is further to be noted, that the second satellite signal 596 (and also the first satellite signal 594) uses no overlay signal in an inventive, satellite-aided broadcast system. In other words, the second satellite signal 596 does not use the overlay layer of the hierarchical modulation, the second satellite signal 596 rather preferably only uses the base layer of the hierarchical information. The base layer (and only the base layer) is the same for the second satellite signal 596 and the terrestrial transmit signal 598 emitted from the terrestrial transmitting station 530. In other words: Only the base layer is the same for the satellite and the terrestrial transmitter. Further, (as mentioned above) for the terrestrial and the satellite signal the same carrier frequency may be used, from which a substantial advantage of the inventive satellite-aided broadcast system results. A receiver 600 thus only has to receive signals having one carrier frequency, whereby the receiver 600 may be designed very simple and cost effectively.

Figure 13:
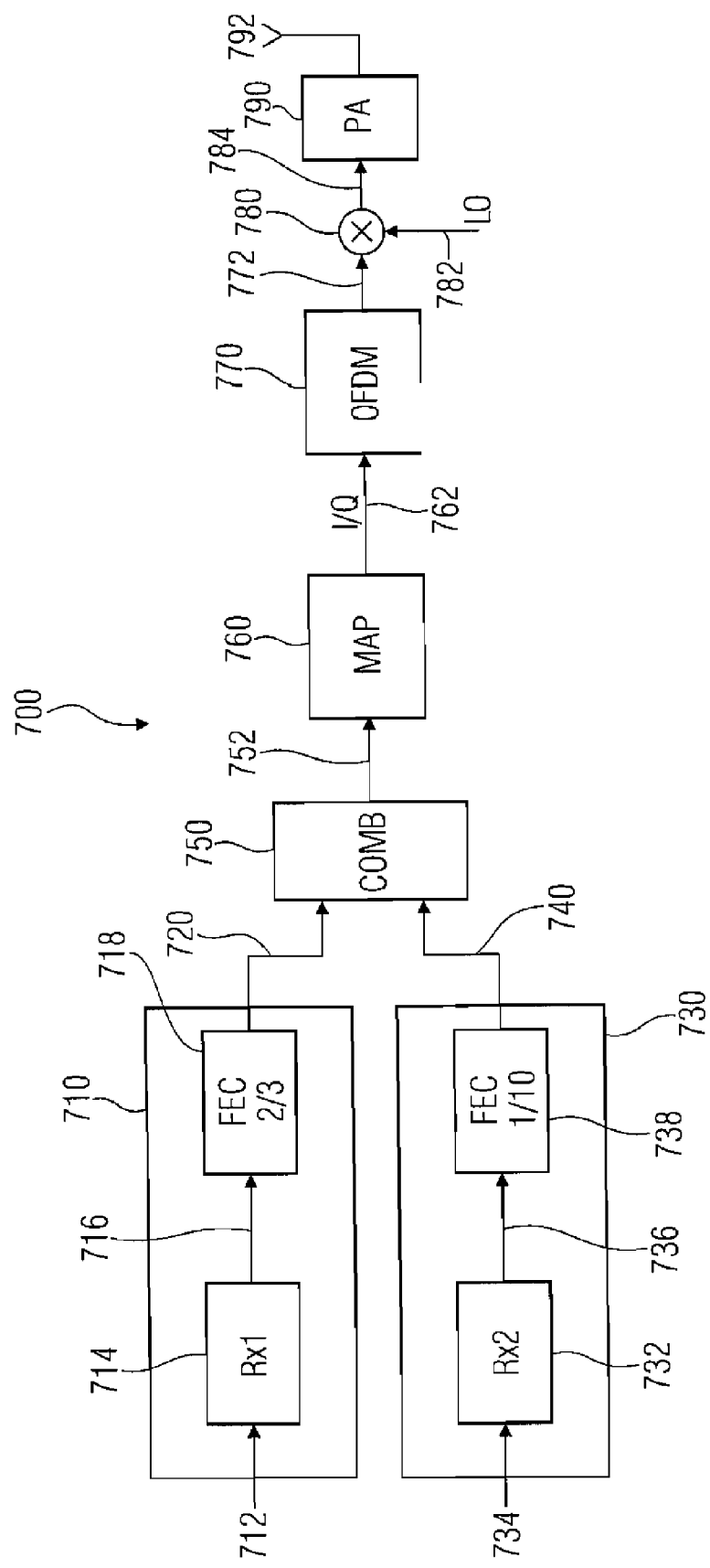
FIG. 13 shows a block diagram of an inventive transmitting station according to a sixth embodiment of the present invention.

FIG. 13 shows a block diagram of an inventive transmitting station according to a sixth embodiment of the present invention. The transmitting station illustrated in FIG. 13 is designated by 700 in its entirety. Apart from that it is to be noted, that the transmitting station 700 illustrated in FIG. 13 is very similar to the transmitting station 100 illustrated in FIG. 8, so that reference is also made to the description referring to the transmitting station 100 of FIG. 8. Further, the transmitting station 700 illustrated in FIG. 13 also comprises features which were already described with reference to FIG. 9, so that reference is also made to the explanations there.

The transmitting station 700 comprises a first receiver 710 which is implemented to receive a satellite signal 712. The first receiver 710 includes a first receiver front end 714 which the satellite signal 712 is supplied to. The receiver front end 714 for example includes one or several frequency converters and/or a demodulator. The first receiver front end 714 provides a bit stream 716 to a first channel encoder 718. The first (optional) channel encoder 718 may for example perform a forward error correction (FEC) with a code rate of for example ⅔=0.667 and thus provides a satellite receive signal 720. A second receiver 730 is set up similar to the first receiver 710. Here, typically a second receiver front end 732 of the second receiver 730 is substantially different from the first receiver front end 714 of the first receiver 710, as the second receiver front end 732 is preferably implemented to receive a local signal 734. The local signal 734 may, for example, be provided via a wire-bonded transmission link or an optical waveguide transmission link from a local data source. Local data sources may for example be reproducing devices for analog or digital media. The local data source may, however, also be a personal computer which provides payload data to be sent out. The local data source may apart from that also be connected via a terrestrial radio link (for example a terrestrial directional radio link). Apart from that it is to be noted, that a bit stream 736 provided by the second receiver front end 732 is supplied to a second channel encoder 738 which, for example, performs a forward error correction with a code rate of ⅒=0.1.

Expressed in general it is preferred that the code rate of the first channel encoder 718 lies in a range of ⅓ to ⅔, while the code rate of the second channel encoder 738 is preferably selected to be smaller than 0.15. Apart from that, the second channel encoder 738 provides a local receive signal 740.

Both, the satellite receive signal 720 and also the local receive signal 740 may be written with encoded data signals, wherein a binary encoding is preferred. The data symbols contained in the satellite receive signal 720 and the local receive signal 740 are then combined into combined data symbols 752 in the bit stream combiner 750. The combined data symbols 752 (which are again preferably present in the form of a parallel or serial bit stream) are then mapped onto modulation symbols by a mapper 760 which are for example provided as a complex-valued combination signal (with an in-phase component and a quadrature component) 762. An OFDM modulator (OFDM="orthogonal frequency deviation multiplex") 770 then receives the complex-valued combination signal 762 and generates an OFDM-modulated signal 772. The OFDM-modulated signal 772 is then supplied to a mixer 780 in the transmitter where it is mixed with an oscillator signal 782 of a local oscillator (LO). By the mixer, thus a frequency conversion may be obtained. Possibly required filters are not shown here for simplification. A power amplifier 790 finally amplifies the mixed signal 784 and makes the amplified signal available for an antenna 792.

It should be noted here, that the use of channel encoders 718, 738 with different code rates is advantageous, as by the principle of the hierarchical modulation the local receive signal 740 is more prone to channel interferences which may occur in a wireless transmission. It is further to be noted, that an OFDM modulation behaves especially well in combination with the hierarchical modulation and is thus used here preferably.

Figure 14:
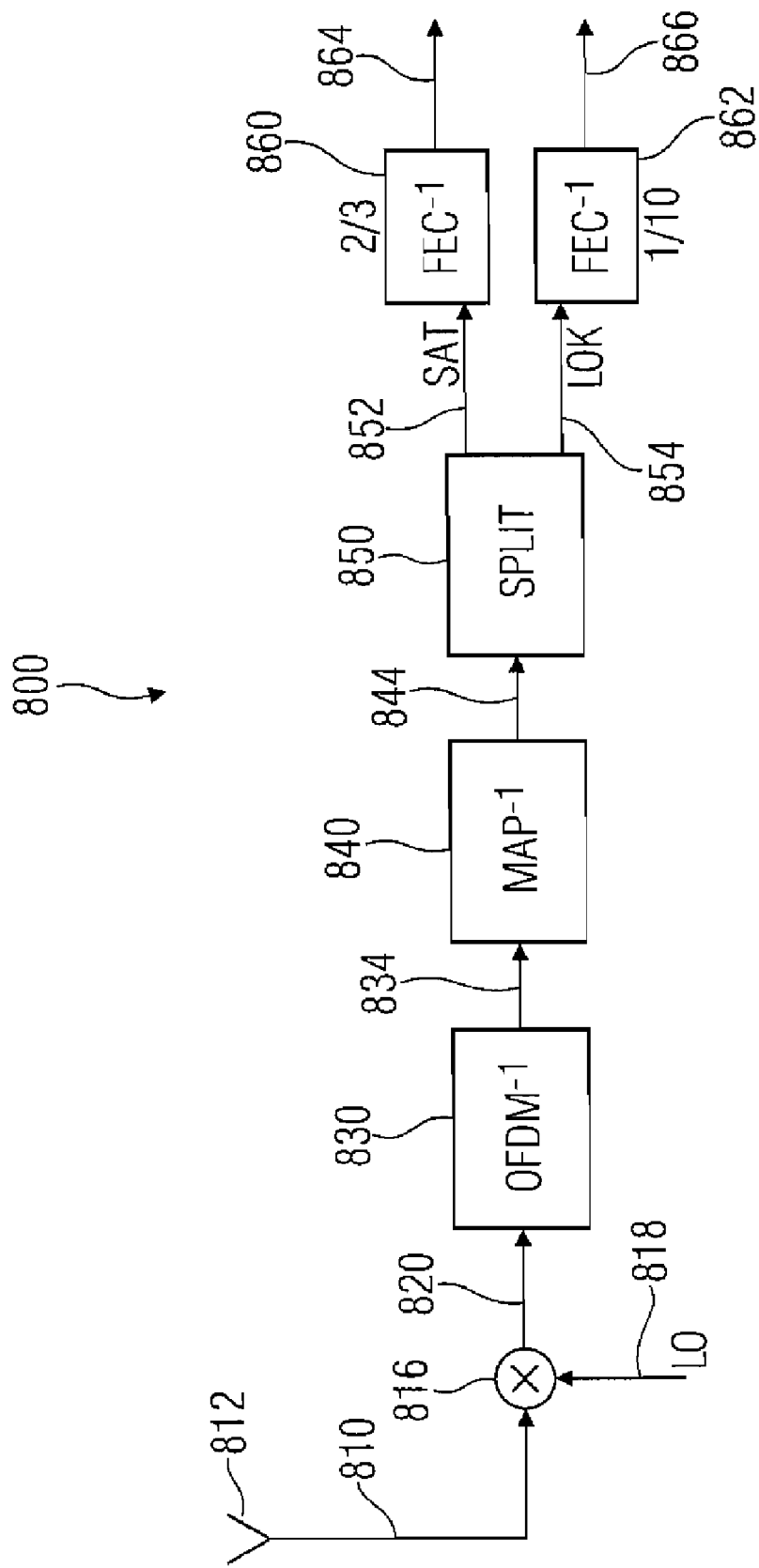
FIG. 14 shows a block diagram of an inventive receiving means according to a seventh embodiment of the present invention.

FIG. 14 shows a block diagram of an inventive receiver according to a seventh embodiment of the present invention. The receiver illustrated in FIG. 14 is designated by 800 in its entirety. The receiver receives a receive signal 810 which is typically provided by an antenna 812 and a satellite signal, a terrestrial signal or an overlay of a satellite signal and a terrestrial signal. The receive signal 810 is supplied to a mixer 816, wherein the receive signal 810 is mixed with an oscillator signal 818 from a local oscillator. Thus, a frequency conversion results, whereby an intermediate frequency signal or a baseband signal 820, respectively, results. The frequency conversion in the mixer 816 is to be regarded as optional, of course, as with special implementations also the receive signal 810 may be directly supplied to a further signal processing.

In the following it is to be assumed as an example, that the intermediate frequency signal or the baseband signal 820, respectively, is supplied to an OFDM demodulator 830. The OFDM demodulator 830 is implemented to undo an OFDM modulation to provide a stream 834 of modulation symbols at its output. The modulation symbols typically consist of one or several complex values which are supplied to a demapper 840. The demapper 840 is implemented to undo a mapping in a transmitter, i.e. a mapping of data symbols to complex-valued modulation symbols. In other words, the demapper 840 is preferably implemented to determine the position of a modulation symbol from the stream 834 of modulation symbols in a constellation diagram and to then, based on that, associate a data symbol to the modulation symbol. Here, the demapper may take hard decisions or soft decisions. Soft decisions include probability statements about the statistical probability of different data symbols, wherein also correlations within the stream 834 of modulation symbols may be used for improving the reliability of the decisions. Apart from that it is to be noted, that the demapper 840 is preferably implemented to be able to process a hierarchical modulation and to be able to associate a data symbol to every modulation symbol of the overlay layer.

A stream 844 of data symbols is thus applied to the output of the demapper 840, wherein each data symbol includes one or several bits which is/are associated with the base layer of the hierarchical modulation, and one or several bits which is/are associated with the overlay layer of the hierarchical modulation. As a precaution it is to be noted here, that the bits of the overlay layer of the hierarchical modulation of course only occur or comprise a well-defined value, respectively, when the overlay layer of the hierarchical modulation is actually used in the receive signal 810, i.e. when for example in the receive signal 810 at least a portion of the terrestrial transmit signal is contained.

The receiver 800 further includes a bit stream splitter 850 which receives the stream 844 of data symbols. The bit stream splitter or data stream splitter 850, respectively, is implemented to provide a first data stream 852 at a first output which includes those bits from the data symbols of the stream 844 of data symbols which are associated with the base layer of the hierarchical modulation. In other words, in an inventive satellite-aided broadcast system (for example according to FIG. 12) the first data stream 852 includes those information contained in the first satellite signal 594 or in the second satellite signal 596, respectively, (wherein it is assumed that in the two satellite signals 594, 596 the same information is contained delayed in time). Further, the data stream splitter 850 is implemented to provide those bits from the stream 844 of data symbols in a second data stream 854 which are associated with the overlay layer of the hierarchical modulation. In other words, a second data stream 854 includes those information provided from the local data source 550 in a satellite-aided broadcast system 500 according to FIG. 12.

As mentioned above, it is preferred to use a channel encoding with a high code rate for the information contained in the base layer of the hierarchical modulation, while it is preferred to use a channel encoding with a (compared to the code rate mentioned first) low code rate for the information contained in the overlay layer of the hierarchical modulation. Thus, in the inventive receiver 800 the first data stream 852 is associated with a (optional) first channel decoder 860. The same uses a redundancy contained in the first data stream 852 (optional) and thus performs an error correction. The channel decoder 860 may here for example be a VITERBI decoder, but also any other channel decoder (e.g. turbo or low density parity check (LDPC) decoder) may be used.

Similarly, also the second data stream 854 is supplied to a second channel decoder 862 which also performs a channel decoding and thus an error correction function. It is especially advantageous here when the first channel decoder 860 comprises a substantially higher code rate than the second channel decoder 862. For example, for the first channel decoder 860 preferably a code rate higher than $\frac{1}{3}$, typically higher than $\frac{1}{2}$, is used.

For the second channel decoder 862, however, preferably a code rate is used which is lower than 0.2. Again better results may be achieved with a code rate lower than 0.15 and in the preferred embodiment a code rate of $\frac{1}{10}=0.1$ is used.

The first channel decoder 68 thus provides a channel-decoded bit stream 864 representing the information contained in the base layer of the hierarchical modulation. Similarly, the second channel decoder 862 provides a second channel-decoded data stream 866 representing the information contained in the overlay layer of the hierarchical modulation.

In other words, the first channel-decoded data stream 864, in connection with an inventive satellite-aided broadcast system, provides the information globally broadcast by the satellite, while the second channel-decoded data stream 866 provides the local information from the local data source separate from the same.

Thus, the inventive receiver 800 enables to provide the globally emitted satellite information separate from the local information, wherein the different susceptibility of the two pieces of information with regard to channel-induced interferences is compensated by the use of differently dimensioned channel decoders 860, 862 (having different code rates).

Figure 15:
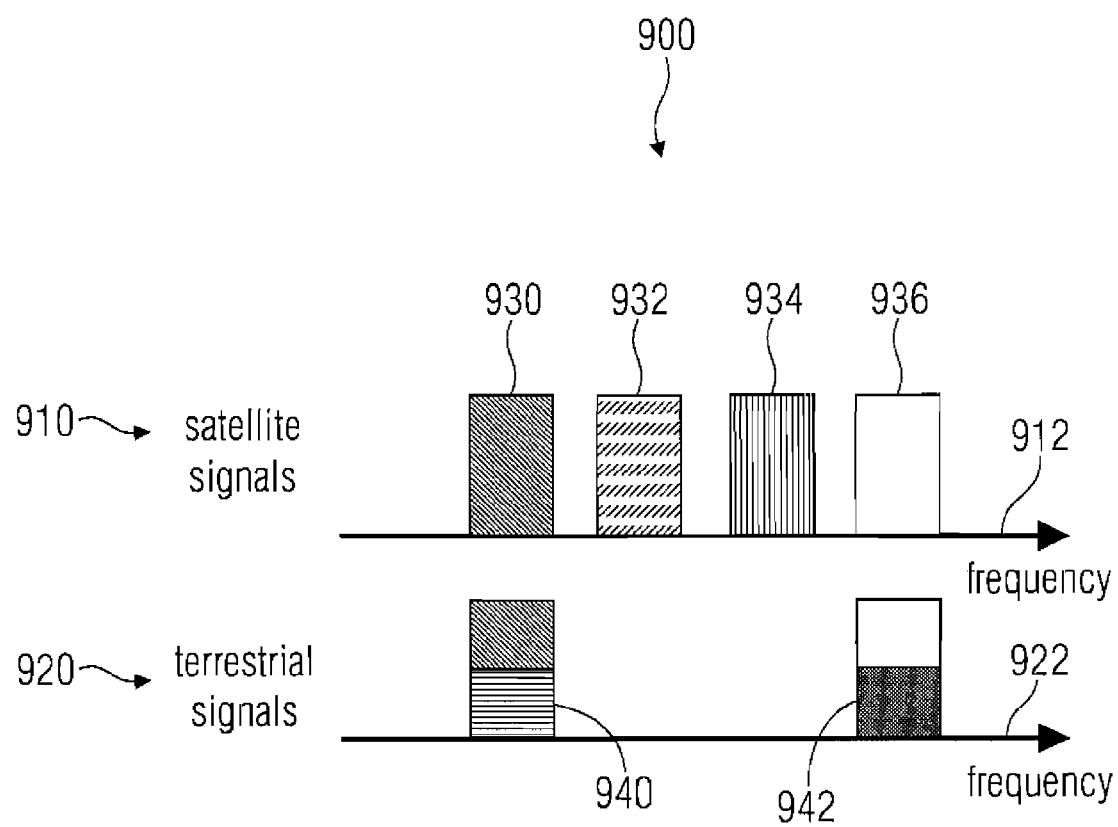
FIG. 15 shows a graphical illustration of an exemplary association of carrier frequencies of satellite signals and terrestrial signals.

FIG. 15 shows a graphical illustration of an exemplarily allocation of carrier frequencies for satellite signals and terrestrial signals. The graphical representation of FIG. 15 is designated by 900 in its entirety. A first frequency representation 910 describes the frequency range of satellite signals, wherein the frequency is plotted at an abscissa 912. A second frequency representation 920 describes the frequency range of terrestrial signals, wherein again the frequency is plotted at an abscissa 922.

The graphical illustration 900 thus shows an example for an allocation of carrier frequencies according to a possible configuration of an inventive satellite-aided broadcast system. In the example described with reference to FIG. 15, four ensembles (program packets) are emitted via satellite. Here it is for example sensible to associate programs to the ensembles according to the respective target group. For example, in the preferred embodiment, a first ensemble A also designated by 930 mainly contains programs in German language. The other ensembles concentrate on the other languages. For example, the ensemble B, also designated by 932, concentrates on French, the ensemble C, also designated by 934, concentrates on Spanish, and the ensemble D, also designated by 936, concentrates on English.

It is further to be noted here, that according to the present embodiment, the four ensembles, ensemble A, ensemble B, ensemble C and ensemble D, 930, 932, 934, 936 are emitted by a satellite on different frequencies, as it may be seen from the first frequency representation 910.

For a satellite receiver all signals, i.e. the signals of all ensembles, are available, provided the transmitting power of the satellite is high enough and the receiver is designed for receiving the frequency range associated with the respective ensemble.

Further, preferably, in selected regions (e.g. in large cities) individual ensembles are also emitted terrestrially. Thus, it may for example be necessary for reasons of media law, that only individual ensembles are emitted. Apart from that, it may also merely serve for cost reduction that only individual ensembles are emitted. In the illustrated example, the German language and the English language programs (i.e. the ensemble A 930 and the ensemble D 936) are selected for a terrestrial emission, as it may further be seen from the second frequency representation 920 for the terrestrial signals. An overlay signal is added to the terrestrial signal in each ensemble. The overlay signals are here designated by 940 and 942. The amplitude of the overlay signal is very low and may for example be 14 dB below the signal strength of the base layer signal. In other words, the ensembles emitted by the satellite are transmitted in the base layer of a hierarchical modulation, and an overlay signal is added to the base layer of the hierarchical modulation which is for example weaker by 14 dB than the signal of the base layer.

Preferably, a very low code rate is used for the overlay signal. For example, the code rate for the overlay signal is 0.1, while the code rate for the base layer signal is ½. Thus, for the overlay signal a range results which is comparable to the base layer signal. The data rate of the overlay signal is thus approximately 15% of the data rate of the base layer signal. Assuming a satellite signal for example makes 50 programs (e.g. radio programs or TV programs) available, in the above-described example (by the use of the overlay signal) seven regional programs (coming from a local data source) could be supplemented. It is further noted that the regional programs may be different in every region.

In summary it may be said, that it is the object of the present invention to provide a satellite-aided system which increases the flexibility for a regional terrestrial supply based on the advantages of the hybrid approach according to the EU147-DAB system. The corresponding system architecture was illustrated in detail with reference to the figures. The system may be briefly described as follows:

- A ground station sends a multiplex of signals (e.g. broadcast programs) to a satellite.
- The ground station transmits two signals to a satellite or to several satellites. A first signal (Sig A) is provided for the direct receipt by mobile or portable receivers. A second signal (Sig B) is provided for passing the signals to terrestrial transmitters.
- So that the terrestrial transmitter may emit the signal so that it arrives at a mobile receiver simultaneously to the satellite signal, the first signal (Sig A) is transmitted from the ground station with a slight delay (e.g. some ms).
- The terrestrial transmitter contains a satellite receiver and a terrestrial modulator.
- The terrestrial modulator supports a hierarchical modulation, wherein the hierarchical modulation provides a base layer (BL) and a overlay layer (OL). Accordingly, the modulator has two inputs. Via a first input of the modulator, the data for the base layer (BL) is applied. Via a second input, the data for the overlay layer (OL) is applied.
- The base layer (BL) is used for a terrestrial emission of the satellite signal. For this purpose, the repeater (i.e. for example the terrestrial transmitting station) contains a satellite receiver. The output of the satellite receiver is connected to the input "BL" (base layer input) of the modulator. At the second input of the modulator a signal independent of the base layer (BL) may be applied.
- The modulator generates a hierarchically-modulated signal from the two signals. A possible form of realization is the non-uniform constellation according to the DVB-T standard.
- Generally, both for the base layer (BL) and also for the overlay layer (OL) an error-corrected code is used. Via a code rate, the required signal-to-noise ratio may be set.
- The code rate for the overlay layer OL may be selected independent of the code rate of the base layer BL.
- If for the overlay layer OL a substantially lower code rate is selected (than for the base layer), then it may for example be achieved that the range of the overlay layer signal (OL signal) is to a great extent identical to the range of the base layer signal (BL signal).

It may thus be said, that the invention is characterized by the following:

- At least one signal is emitted by a satellite.
- The terrestrial transmitters use a hierarchical modulation.
- The base layer (BL) is used for the terrestrial emission of the satellite signal.
- An overlay signal (OL signal) which is independent of the satellite signal is added to the base layer signal (BL signal).

It is further preferred that for terrestrial signal and for the satellite signal the same carrier frequency and the same modulation types are used. For example, both signals may use an OFDM modulation.

It is further possible, that for the terrestrial signal a different carrier frequency (than for the satellite signal) is used. In this case, the modulation for the terrestrial and the satellite signal may also be different.

It is further preferred to use a better error protection (e.g. a lower code rate) for the overlay signal, so that thereby the range of the overlay signal is to a great extent identical to the one of the base layer signal.

If the terrestrial signal and the satellite signal comprise the same carrier frequency, preferably an OFDM modulation is used both for the satellite signal and also for the terrestrial signal.

If, however, for the terrestrial signal a different carrier frequency is used than for the satellite signal, then it is possible to emit the signals of the base layer (BL signals) only partially or to partially replace the same by other signals. In other words, the base layer signal is partially also used for regional programs.

In the inventive system, further two or more satellites may be used. A terrestrial signal preferably uses the same carrier frequency and, if applicable, also the same modulation type as one of the satellites.

It is further preferred to use a receiver which can decode a signal with a hierarchical modulation, wherein an overlay signal (OL signal) is added to the base layer signal which is independent of the base layer signal. It is further preferred that an inventive receiver can simultaneously decode the base layer signal and also the overlay signal.

The present invention thus provides a satellite-aided broadcast system which is also based on an hierarchical modulation which efficiently enables to add local information contents to a signal globally emitted by a satellite with the help of terrestrial transmitting stations.

Depending on the circumstances, the inventive methods may be implemented in hardware or in software. The implementation may take place on a digital storage medium, in particular a floppy disc or CD or DVD having electronically readable control signals which may cooperate with a programmable computer system so that the corresponding method is performed. In general, the invention thus also consists in a computer program product having a program code stored on a machine-readable carrier for performing the inventive method, when the computer program product runs on a computer. In other words, the invention may also be realized as a computer program having a program code for performing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A broadcast system, comprising:

a first terrestrial transmitting station arranged to send out a first terrestrial transmit signal, including an associated first receiver arranged to receive a first transmit signal to obtain a first receive signal, an associated second receiver arranged to receive a first local signal to obtain a local receive signal, a signal combiner arranged to combine the first receive signal with the local receive signal to provide a first combination signal, wherein the signal combiner is implemented to generate the first combination signal so that the first combination signal is configured according to a hierarchical modulation, wherein the first receive signal is included in a base layer of the hierarchical modulation, and wherein the local receive signal is included in an overlay layer of the hierarchical modulation, and a transmitter arranged to send out the first combination signal as the first terrestrial transmit signal; and a second terrestrial transmitting station arranged to send out a second terrestrial transmit signal, including an associated first receiver arranged to receive the first transmit signal to obtain a second receive signal, an associated second receiver arranged to receive a second local signal, to obtain an associated local receive signal, an associated signal combiner arranged to combine the second receive signal with the associated local receive signal to provide a second combination signal, wherein the associated signal combiner is implemented to generate the second combination signal so that the second combination signal is configured according to a hierarchical modulation, wherein the second receive signal is included in a base layer of the hierarchical modulation, and wherein the associated local receive signal is included in an overlay layer of the hierarchical modulation, and an associated transmitter arranged to send out the second combination signal as the second terrestrial transmit signal;

wherein the first terrestrial transmitting station and the second terrestrial transmitting station are implemented to receive different local signals, and wherein the first local signal is different from the second local signal;

wherein the first terrestrial transmitting station and the second terrestrial transmitting station are implemented so that the first combination signal emitted from the first terrestrial transmitting station and the second combination signal emitted from the second terrestrial transmitting station include an equal carrier frequency and an equal modulation type;

wherein the first terrestrial transmitting station and the second terrestrial transmitting station are further arranged so that an overlapping area exists in which the first combination signal emitted from the first terrestrial transmitting station and the second combination signal emitted from the second terrestrial transmitting station constructively overlap regarding the base layer of the hierarchical modulation;

wherein a carrier frequency of each of the first and second combination signals emitted from the first and second terrestrial transmitting stations is equal to a carrier frequency of a second transmit signal which is a satellite signal and which is receivable in the overlapping area;

wherein the first transmit signal includes a payload data content including a payload data content of the second transmit signal;

wherein information included in the base layer of the first terrestrial transmit signal emitted from the first terrestrial transmitting station is equal to information included in a base layer of the second transmit signal; and wherein the base layer of the hierarchical modulation of the second terrestrial transmit signal is equal to the base layer of the hierarchical modulation of the second combination signal emitted from the second terrestrial transmitting station.

2. The broadcast system according to claim 1, further including a satellite and a satellite base station;

wherein the satellite base station is implemented to transmit a first base station signal to the satellite;

wherein the satellite is implemented to pass on the first base station signal as a first satellite signal and to provide a second satellite signal which is delayed compared to the first satellite signal by a predetermined delay time;

wherein the first satellite signal defines the first transmit signal; and wherein the second satellite signal defines the second transmit signal.

3. A broadcast system according to claim 1, further comprising a satellite and a satellite base station which is implemented to send a first base station signal and a second base station signal to the satellite;

wherein the satellite is implemented to pass on the first base station signal as a first satellite signal and to pass on the second base station signal as a second satellite signal;

wherein the satellite base station and the satellite are implemented so that the first satellite signal includes a payload data content which includes a payload data content of the second satellite signal, and so that the second satellite signal is delayed compared to the first satellite signal by a predetermined delay time;

wherein the first satellite signal defines the first transmit signal; and wherein the second satellite signal defines the second transmit signal.

4. The broadcast system according to claim 3, wherein the first satellite signal and the second satellite signal include the same payload data content.

5. The broadcast system according to claim 2, wherein the satellite is implemented so that the second satellite signal has a greater signal strength than the first satellite signal.

6. The broadcast system according to claim 1, wherein the first receiver of the first terrestrial transmitting station is implemented to receive a first satellite signal, and wherein the first receiver of the second terrestrial transmitting station is implemented to receive the first satellite signal.

7. The broadcast system according to claim 1, further comprising a satellite base station and a satellite that are implemented so that a satellite signal includes information only in a base layer of the hierarchical modulation.

8. The broadcast system according to claim 1, further comprising a satellite ground station and a satellite that are implemented so that information included in the base layer of the first terrestrial transmit signal emitted from the first terrestrial transmitting station is equal to information included in a base layer of a second satellite signal.

9. The broadcast system according to claim 1, further including a satellite.

10. The broadcast system according to claim 1, wherein a modulation type of at least one of the first combination signal emitted from the first terrestrial transmitting station and the second combination signal emitted from the second terrestrial transmitting station is equal to a modulation type of the second transmit signal regarding the base layer of the hierarchical modulation.

11. A broadcast system, comprising:
a first transmitter which is implemented to emit a first transmit signal;
a first terrestrial transmitting station arranged to send out a first terrestrial transmit signal, including a first receiver arranged to receive the first transmit signal to obtain a first receive signal, a second receiver arranged to receive a first local signal to obtain a local receive signal, a signal combiner arranged to combine the first receive signal with the local receive signal to provide a first combination signal, wherein the signal combiner is implemented to generate the first combination signal so that the first combination signal is configured according to a hierarchical modulation, wherein the first receive signal is included in a base layer of the hierarchical modulation, and wherein the local receive signal is included in an overlay layer of the hierarchical modulation, and a transmitter arranged to send out the first combination signal as the first terrestrial transmit signal; and
a second terrestrial transmitting station arranged to send out a second terrestrial transmit signal including an associated first receiver arranged to receive a satellite signal to obtain an associated satellite receive signal, an associated second receiver arranged to receive a second local signal to obtain an associated local receive signal, an associated signal combiner arranged to combine the associated satellite receive signal with the associated local receive signal to provide a second combination signal, wherein the signal combiner is implemented to generate the second combination signal so that the second combination signal is configured according to a hierarchical modulation, wherein the associated satellite receive signal is included in a base layer of the hierarchical modulation and wherein the associated local receive signal is included in an overlay layer of the hierarchical modulation, and an associated transmitter arranged to send out the second combination signal as the second terrestrial transmit signal;
wherein the first terrestrial transmitting station and the second terrestrial transmitting station are implemented to receive different local signals;
wherein a base layer of a hierarchical modulation of a second satellite signal is equal to the base layer of the hierarchical modulation of the second combination signal emitted from the second terrestrial transmitting station;
wherein carrier frequencies of the first combination signal emitted from the first terrestrial transmitting station and the second combination signal emitted from the second terrestrial transmitting station are equal;
wherein the first local signal is different from the second local signal; and
wherein the first terrestrial transmitting station and the second terrestrial transmitting station are further arranged so that an overlapping area exists in which the first combination signal emitted from the first terrestrial transmitting station and the second combination signal emitted from the second terrestrial transmitting station overlap.

12. The broadcast system according to claim 11, further including a satellite and a satellite base station which is implemented to send a first base station signal to the satellite;
wherein the satellite is implemented to pass on the first base station signal as a first satellite signal and to provide a second satellite signal which is delayed compared to the first satellite signal by a predetermined delay time.

13. The broadcast system according to claim 11, further comprising a satellite and a satellite base station which is implemented to send a first base station signal and a second base station signal to the satellite;
wherein the satellite is implemented to pass on the first base station signal as a first satellite signal and to pass on the second base station signal as a second satellite signal;
wherein the satellite base station and the satellite are implemented so that the first satellite signal includes a payload data content which includes a payload data content of the second satellite signal, and that the second satellite signal is delayed compared to the first satellite signal by a predetermined delay time.

14. The broadcast system according to claim 13, wherein the first satellite signal and the second satellite signal include the same payload data content.

15. The broadcast system according to claim 12, wherein the satellite is implemented so that the second satellite signal has a greater signal strength than the first satellite signal.

16. The broadcast system according to claim 11, wherein the first receiver of the first terrestrial transmitting station is implemented to receive a first satellite signal and wherein the first receiver of the second terrestrial transmitting station is implemented to receive the first satellite signal.

17. The broadcast system according to claim 11, wherein the first terrestrial transmitting station, the second terrestrial transmitting station and a satellite are implemented so that a second satellite signal, the first combination signal emitted from the first terrestrial transmitting station and the second combination signal emitted from the second terrestrial transmitting station have an equal carrier frequency and an equal modulation type.

18. The broadcast system according to claim 11, further comprising a satellite base station and a satellite that are implemented so that a satellite signal includes an information only in a base layer of the hierarchical modulation.

19. The broadcast system according to claim 11, further comprising a satellite ground station and a satellite that are implemented so that information included in the base layer of the first terrestrial transmit signal emitted from the first terrestrial transmitting station is equal to information included in a base layer of a second satellite signal.

20. The broadcast system according to claim 11, wherein the broadcast system is a satellite-aided broadcast system which is implemented so that a base layer of a hierarchical modulation of a second satellite signal is equal to the base layer of the hierarchical modulation and the first combination signal emitted from the first terrestrial transmitting station.

21. The broadcast system according to claim 11, further including a satellite.

* * * * *

UNITED STATES PATENT AND TRADEMARK OFFICE
CERTIFICATE OF CORRECTION

PATENT NO.        : 8,369,774 B2
APPLICATION NO.   : 11/917588
DATED             : February 5, 2013
INVENTOR(S)       : Eberlein et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1362 days.

Signed and Sealed this
First Day of September, 2015

Michelle K. Lee
*Director of the United States Patent and Trademark Office*